US010107180B2

(12) United States Patent
Kemmerling et al.

(10) Patent No.: US 10,107,180 B2
(45) Date of Patent: Oct. 23, 2018

(54) TWO-STAGE SUPERCHARGING INTERNAL COMBUSTION ENGINE HAVING AN EXHAUST-GAS AFTERTREATMENT ARRANGEMENT, AND METHOD FOR OPERATING A TWO-STAGE SUPERCHARGED INTERNAL COMBUSTION ENGINE

(71) Applicant: Ford Global Technologies, LLC, Dearborn, MI (US)

(72) Inventors: Joerg Kemmerling, Monschau (DE); Vanco Smiljanovski, Bedburg (DE); Helmut Matthias Kindl, Aachen (DE); Werner Willems, Aachen (DE); Franz Arnd Sommerhoff, Aachen (DE); Andreas Kuske, Geulle (NL); Claudia Conee, Herzogenrath (DE); Tim Franken, Aachen (DE); Michael Forsting, Moenchengladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/136,598

(22) Filed: Apr. 22, 2016

(65) Prior Publication Data
US 2016/0312687 A1 Oct. 27, 2016

(30) Foreign Application Priority Data

Apr. 24, 2015 (DE) .................... 10 2015 207 539
Apr. 24, 2015 (DE) .................... 10 2015 207 545
(Continued)

(51) Int. Cl.
*F02B 33/44* (2006.01)
*F02B 33/00* (2006.01)
(Continued)

(52) U.S. Cl.
CPC .......... *F02B 37/013* (2013.01); *F02B 37/002* (2013.01); *F02B 37/025* (2013.01);
(Continued)

(58) Field of Classification Search
CPC .... F02B 37/013; F02B 37/025; F02B 37/127; F02B 37/002; F02B 37/18; F02M 26/08;
(Continued)

(56) References Cited

U.S. PATENT DOCUMENTS 6,484,500 B1 * 11/2002 Coleman .............. F02B 37/013
60/612
7,426,830 B2 * 9/2008 Schorn .................. F02B 37/013
60/612
(Continued)

FOREIGN PATENT DOCUMENTS

DE 19837978 A1 11/1999
DE 10204482 A1 8/2003
(Continued)

Primary Examiner — Thai Ba Trieu
(74) Attorney, Agent, or Firm — Julia Voutyras; McCoy Russell LLP

(57) ABSTRACT

A supercharged internal combustion engine includes at least two exhaust-gas turbochargers arranged in series, wherein a first exhaust-gas turbocharger serves as a low-pressure stage and a second exhaust-gas turbocharger serves as a high-pressure stage. A second turbine of the second exhaust-gas turbocharger may be present upstream of a first turbine of the first exhaust-gas turbocharger, and a second compressor of the second exhaust-gas turbocharger may be arranged in an intake system downstream of a first compressor of the first exhaust-gas turbocharger and a first bypass line may branch off upstream of the second turbine and join back at a junction point between the first turbine and the second turbine.

9 Claims, 14 Drawing Sheets

(30) Foreign Application Priority Data

May 6, 2015 (DE) .................. 10 2015 208 418
May 7, 2015 (DE) .................. 10 2015 208 538
May 11, 2015 (DE) .................. 10 2015 208 684

(51) Int. Cl.

| | |
|---|---|
| *F02D 13/06* | (2006.01) |
| *F02D 17/02* | (2006.01) |
| *F02B 37/013* | (2006.01) |
| *F02B 37/12* | (2006.01) |
| *F02B 37/18* | (2006.01) |
| *F02D 41/00* | (2006.01) |
| *F02D 13/02* | (2006.01) |
| *F02M 26/08* | (2016.01) |
| *F02B 37/00* | (2006.01) |
| *F02B 37/02* | (2006.01) |

(52) U.S. Cl.
CPC ............ *F02B 37/127* (2013.01); *F02B 37/18* (2013.01); *F02D 13/0257* (2013.01); *F02D 41/0007* (2013.01); *F02D 41/0087* (2013.01); *F02M 26/08* (2016.02); *Y02T 10/144* (2013.01); *Y02T 10/18* (2013.01)

(58) Field of Classification Search
CPC ............ F02D 13/0257; F02D 41/0007; F02D 41/0087; Y02T 10/144
USPC .................. 60/612; 123/562, 198 F
See application file for complete search history.

(56) References Cited

U.S. PATENT DOCUMENTS

| | | | | |
|---|---|---|---|---|
| 8,230,684 | B2 * | 7/2012 | Delavan | ............ F02D 41/0007 60/612 |
| 8,490,395 | B2 | 7/2013 | Grissom et al. | |
| 8,635,869 | B2 | 1/2014 | An et al. | |
| 2005/0081835 | A1 | 4/2005 | Larson et al. | |
| 2006/0070381 | A1 * | 4/2006 | Parlow | ................. F02B 37/013 60/612 |
| 2007/0062188 | A1 | 3/2007 | Fry et al. | |
| 2007/0119171 | A1 | 5/2007 | Boyapati et al. | |
| 2008/0173016 | A1 | 7/2008 | Barthelet | |
| 2008/0216795 | A1 | 9/2008 | Dietz et al. | |
| 2009/0007563 | A1 | 1/2009 | Cooper et al. | |
| 2010/0064685 | A1 * | 3/2010 | Auffret | ................. F02B 37/013 60/602 |
| 2011/0094485 | A1 | 4/2011 | Vuk et al. | |
| 2012/0255298 | A1 * | 10/2012 | Auffret | ................. F02B 37/013 60/605.2 |
| 2013/0006494 | A1 * | 1/2013 | Petrovic | ................. F02B 37/013 701/102 |
| 2013/0031902 | A1 | 2/2013 | Erdmenger et al. | |
| 2013/0263831 | A1 * | 10/2013 | Auffret | ................. F02B 37/013 123/568.11 |
| 2014/0144134 | A1 * | 5/2014 | McEwan | ............... F02B 37/013 60/602 |
| 2015/0082789 | A1 * | 3/2015 | Drangel | ................. F02B 37/013 60/612 |
| 2015/0285191 | A1 * | 10/2015 | Kitada | ................. F02B 37/013 60/605.2 |
| 2016/0108798 | A1 * | 4/2016 | VanDerWege | ...... F02D 41/0007 60/602 |
| 2016/0290220 | A1 * | 10/2016 | Smiljanovski | ........ F02B 37/013 |
| 2016/0369717 | A1 * | 12/2016 | Brinkmann | ......... F02D 41/0007 |
| 2017/0218834 | A1 * | 8/2017 | Kemmerling | ........ F02B 37/013 |
| 2017/0226924 | A1 * | 8/2017 | Stoffels | ................. F02B 37/007 |
| 2018/0010512 | A1 * | 1/2018 | Kemmerling | ......... F02B 37/013 |

FOREIGN PATENT DOCUMENTS

| | | |
|---|---|---|
| DE | 102004028482 A1 | 12/2005 |
| DE | 102004035323 A1 | 2/2006 |
| DE | 102004061028 A1 | 7/2006 |
| DE | 102011120337 A1 | 6/2013 |
| DE | 202014100426 U1 | 4/2014 |
| DE | 202014102710 U1 | 7/2014 |
| DE | 102013215574 A1 | 2/2015 |
| EP | 1640597 A1 | 3/2006 |
| FR | 2844549 A1 | 3/2004 |
| FR | 2940366 A1 | 6/2010 |
| GB | 2507061 A | 4/2014 |
| JP | 63309726 A * | 12/1988 ............ F02B 37/013 |
| JP | 04164123 A * | 6/1992 ............ F02B 37/013 |
| JP | 07293262 A * | 11/1995 ............ F02B 37/18 |

\* cited by examiner

FIG. 4
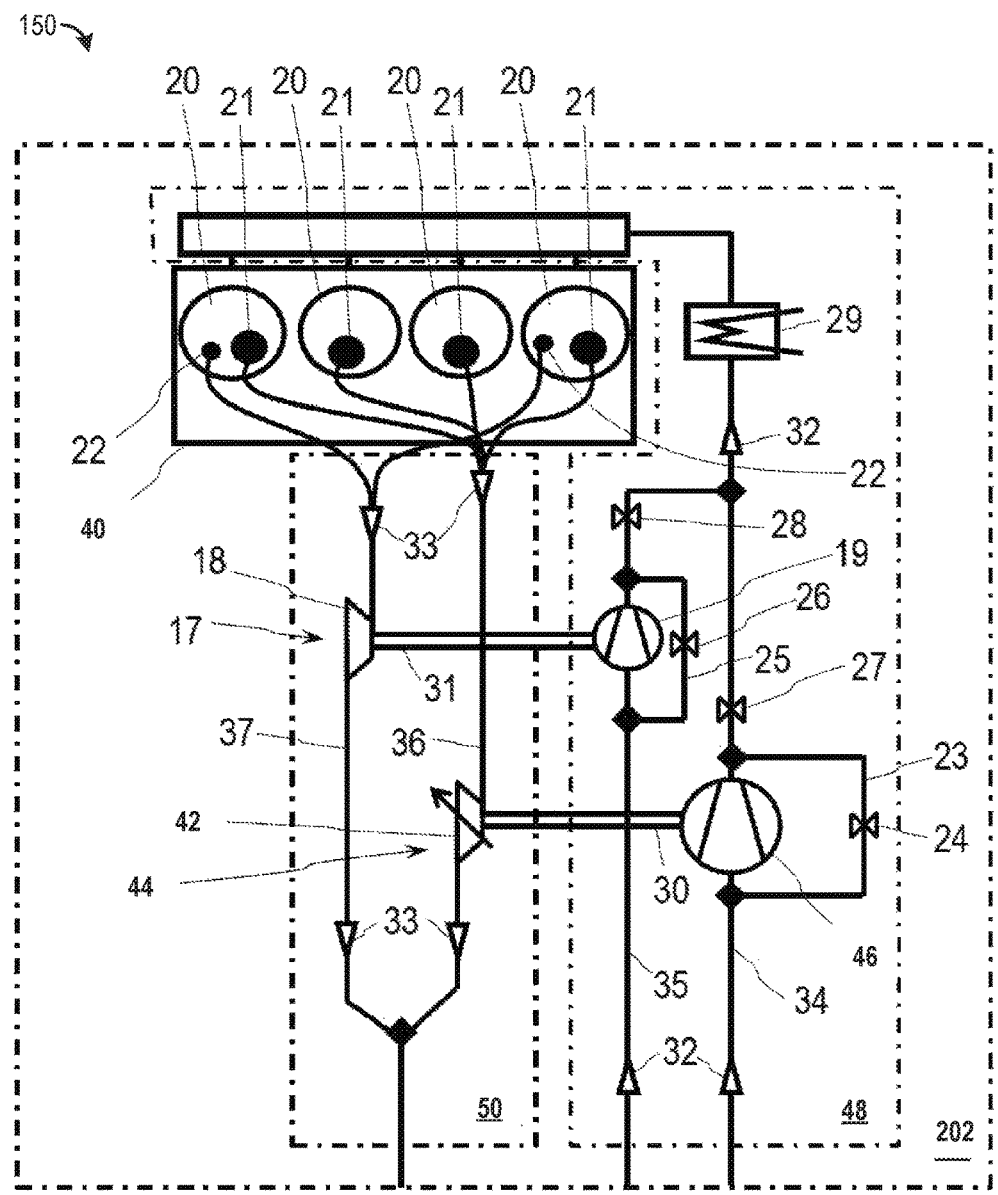
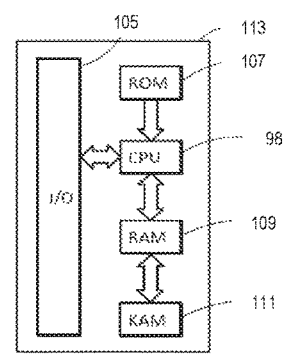

FIG. 10
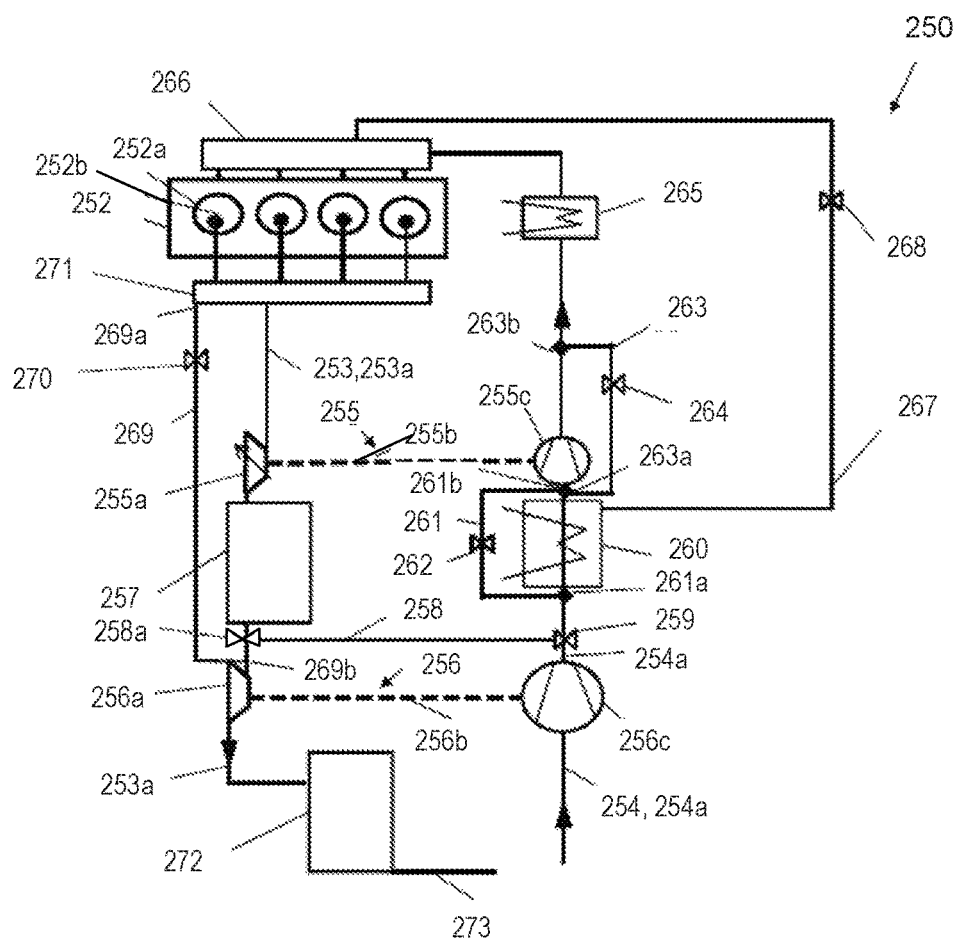
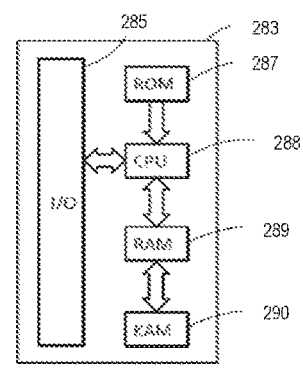

FIG. 12
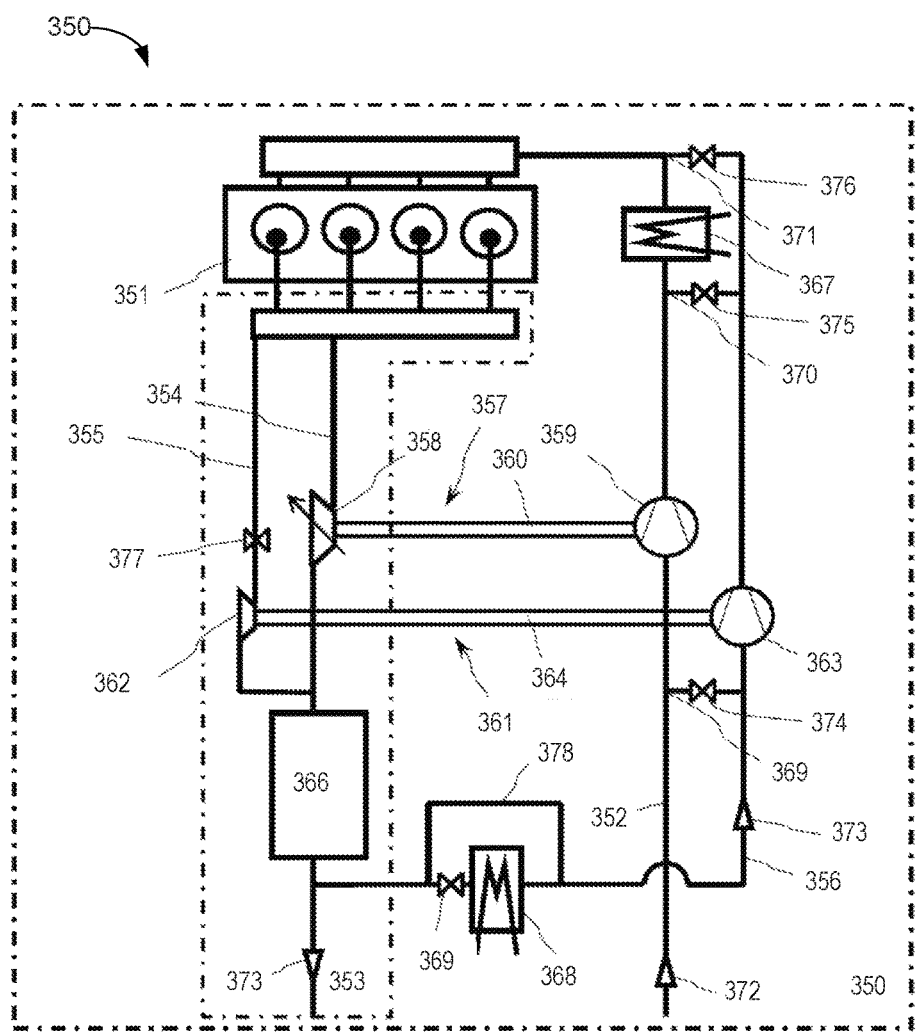
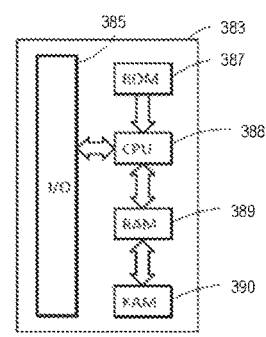

FIG. 13
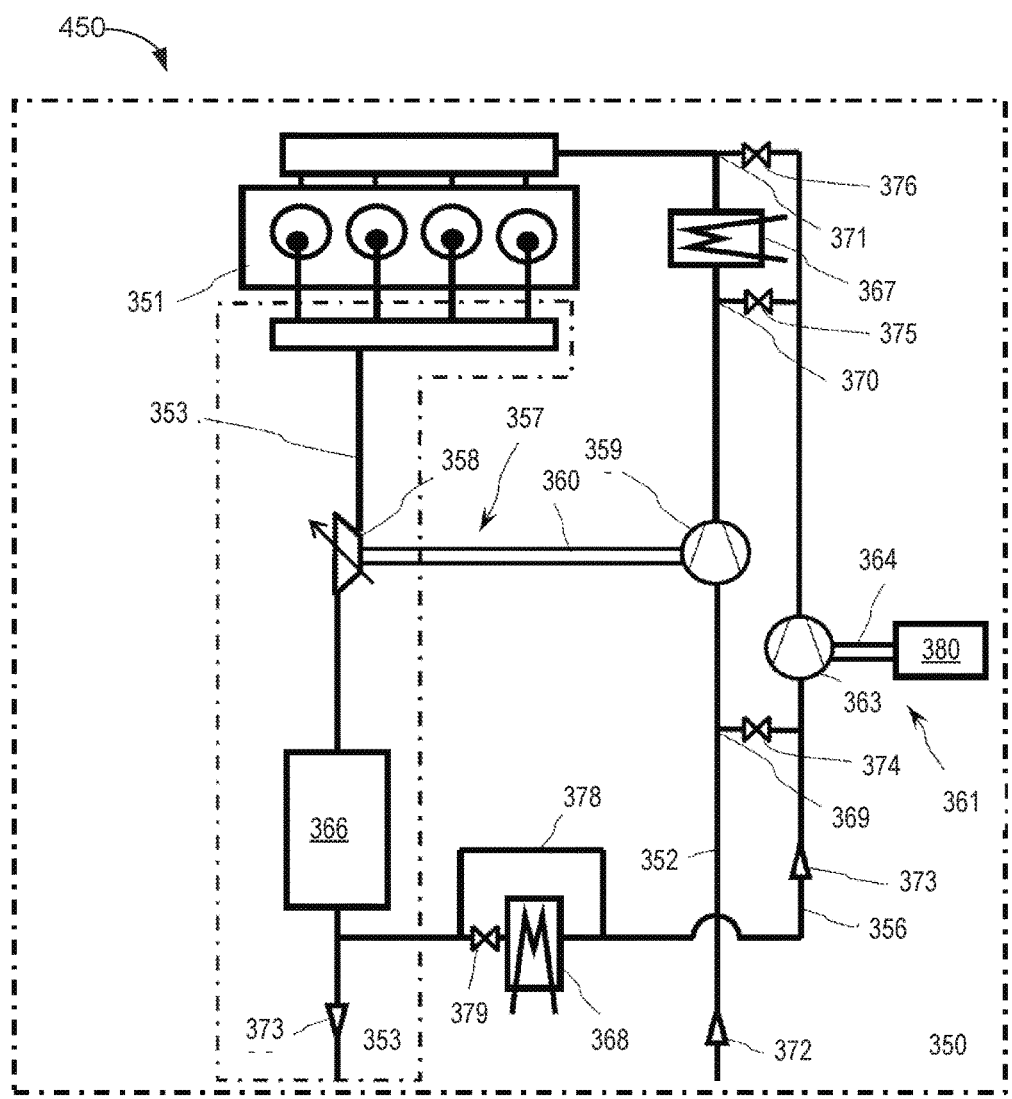
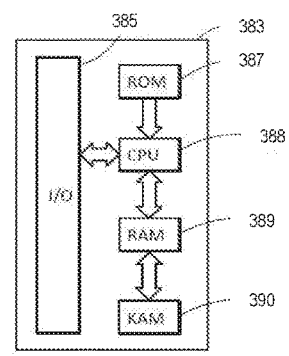

TWO-STAGE SUPERCHARGING INTERNAL COMBUSTION ENGINE HAVING AN EXHAUST-GAS AFTERTREATMENT ARRANGEMENT, AND METHOD FOR OPERATING A TWO-STAGE SUPERCHARGED INTERNAL COMBUSTION ENGINE

CROSS REFERENCE TO RELATED APPLICATIONS

This application claims priority to German Patent Application No. 102015207539.7, filed Apr. 24, 2015, German Patent Application No. 102015207545.1, filed Apr. 24, 2015, German Patent Application No. 102015208538.4, filed May 7, 2015, German Patent Application No. 102015208684.4, filed May 11, 2015, and German Patent Application No. 102015208418.3, filed May 6, 2015, the entire contents of each of which are hereby incorporated by reference for all purposes.

FIELD

The disclosure relates to an internal combustion engine.

BACKGROUND/SUMMARY

Within the context of the present disclosure, the expression "internal combustion engine" encompasses Otto-cycle engines, diesel engines and also hybrid internal combustion engines, which utilize a hybrid combustion process, and hybrid drives which comprise not only the internal combustion engine but also an electric machine which may be connected in terms of drive to the internal combustion engine and which receives power from the internal combustion engine or which, as a switchable auxiliary drive, additionally outputs power.

Supercharging is a suitable means for increasing the power of an internal combustion engine while maintaining an unchanged swept volume, or for reducing the swept volume while maintaining the same power. In any case, supercharging leads to an increase in volumetric power output and an enhanced power-to-weight ratio. If the swept volume is reduced, it is thus possible, given the same vehicle boundary conditions, to shift the load collective toward higher loads, at which the specific fuel consumption is lower. In the development of internal combustion engines, it is a basic aim to minimize fuel consumption, wherein the emphasis in the efforts being made is on obtaining good overall efficiency.

Fuel consumption and thus efficiency pose a problem in particular in the case of Otto-cycle engines that is to say in the case of an applied-ignition internal combustion engine. The reason for this lies in the fundamental operating process of the Otto-cycle engine. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more the throttle flap blocks the intake system, the higher the pressure loss of the inducted air across the throttle flap, and the lower the pressure of the inducted air downstream of the throttle flap and upstream of the inlet into the at least three cylinders, that is to say combustion chambers. For a constant combustion chamber volume, it is possible in this way for the air mass, that is to say the quantity, to be set by means of the pressure of the inducted air. This also explains why quantity regulation has proven to be disadvantageous specifically in part-load operation, because low loads need a high degree of throttling and a pressure reduction in the intake system, as a result of which the charge exchange losses increase with decreasing load and increasing throttling. To reduce the described losses, various strategies for dethrottling and applied-ignition internal combustion engine have been developed.

One approach to a solution for dethrottling the Otto-cycle engine is for example, an Otto-cycle engine operating process with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system.

Another option for optimizing the combustion process of an Otto-cycle engine includes the use of an at least partially variable valve drive. By contrast to conventional valve drives, in which both the lift of the valves and the timing are invariable, these parameters which have an influence on the combustion process, and thus on fuel consumption, can be varied to a greater or lesser extent by means of variable valve drives. If the closing time of the inlet valve and the inlet valve lift can be varied, this alone makes throttling-free and thus loss-free load control possible. The mixture mass which flows into the combustion chamber during the intake process is then controlled not by means of a throttle flap but rather by means of the inlet valve lift and the opening duration of the inlet valve.

For supercharging, use is generally made of an exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooling arrangement may additionally be provided, by means of which the compressed charge air is cooled before it enters the cylinders.

The advantage of an exhaust-gas turbocharger for example in relation to a mechanical charger is that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

Problems are encountered in the configuration of the exhaust-gas turbocharging, wherein it is basically sought to obtain a noticeable performance increase at all engine speed ranges. In the case of supercharged internal combustion engines with an exhaust-gas turbocharger, a noticeable torque drop is observed when a certain engine speed is undershot. The effect is undesirable and is thus, also one of the most severe disadvantages of exhaust-gas turbocharging.

The torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. As a result, the charge pressure ratio likewise decreases in the direction of lower engine speeds, which equates to a torque drop.

Previously, a variety of measures have been used to enhance the torque characteristic of an exhaust gas-turbocharged internal combustion engine, including a small turbine cross section and provision of an exhaust-gas blow-off facility. To this end, the turbine is equipped with a bypass line which branches off from the exhaust-gas discharge system upstream of the turbine and in which a shut-off element is arranged. Such a turbine is also referred to as a wastegate turbine. If the exhaust-gas mass flow exceeds a threshold value, a part of the exhaust-gas flow is conducted past the turbine, that is to say is blown off, via a bypass line during the course of the so-called exhaust-gas blow-off. This procedure has the disadvantage that the high-energy blown-off exhaust gas remains unutilized and the supercharging behavior is often insufficient at higher engine speeds.

A turbine having a variable turbine geometry permits a more comprehensive adaptation to the respective operating point of the internal combustion engine by way of adjustment of the turbine geometry or the effective turbine cross section, enabling engine speed-dependent or load-dependent regulation of the turbine geometry to take place to a certain extent.

The torque characteristic of the supercharged internal combustion engine may also be enhanced by means of multiple turbochargers arranged in parallel, for example, by means of multiple turbines of relatively small turbine cross section arranged in parallel. The turbines may be activated successively with increasing exhaust-gas flow rate, similar to sequential supercharging.

The torque characteristic may also be influenced by connecting multiple exhaust-gas turbochargers in series. In one example, connecting two exhaust-gas turbochargers in series, wherein a first exhaust-gas turbocharger serves as a high-pressure stage and a second exhaust-gas turbocharger serves as a low-pressure stage, the compressor characteristic map may be expanded to include both smaller compressor flows and larger compressor flows.

In particular, with the first exhaust-gas turbocharger, which serves as a high-pressure stage, it is possible for the surge threshold to be shifted in the direction of smaller compressor flows; because of which high charge pressure ratios may be obtained even with small compressor flows, which may considerably enhance the torque characteristic in the lower part-load range. This is achieved by using the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again downstream of the high-pressure turbine and upstream of the low-pressure turbine, that is to say between the two turbines, wherein a shut-off element is arranged in the bypass line in order to control the exhaust-gas flow conducted past the high-pressure turbine.

The two exhaust-gas turbochargers connected in series further increase the power boost through supercharging. Furthermore, the response behavior of an internal combustion engine with two exhaust-gas turbochargers may be considerably enhanced, particularly in the part-load range compared to a similar internal combustion engine with single-stage supercharging. The reason for this is that the relatively small high-pressure stage is less inert than a relatively large exhaust-gas turbocharger used for single-stage supercharging, because a rotor or impeller of an exhaust-gas turbocharger of smaller dimensions may accelerate and decelerate more quickly.

This also has advantages with regard to particle emissions. In a large single exhaust-gas turbocharger, during acceleration, the required increase in the air mass supplied to the cylinders for the increased fuel flow rate takes place with a delay owing to the inertia of the large impellers. In contrast, with a relatively small high-pressure turbocharger, the charge air is supplied to the engine virtually without a delay, and thus operating states with increased particle emissions are more commonly eliminated.

Exhaust-gas turbocharging in combination with exhaust-gas aftertreatment has proven to be problematic. When using an exhaust-gas turbocharger, it is fundamentally sought to arrange the turbine of the charger as close to the engine, that is to say to the outlet openings of the cylinder, as possible in order thereby to be able to optimally utilize the exhaust-gas enthalpy of the hot exhaust gases, which is determined significantly by the exhaust-gas pressure and the exhaust-gas temperature, and to ensure a fast response behavior of the turbocharger. Furthermore, the path of the hot exhaust gases to the different exhaust-gas aftertreatment systems may also be as short as possible such that the exhaust gases are given little time to cool down and the exhaust-gas aftertreatment systems reach their operating temperature or light-off temperature as quickly as possible, in particular after a cold start of the internal combustion engine.

The inventors herein have recognized the above cited potential issues, and propose an engine including a first cylinder group connected to a first turbine through a first exhaust line, a second cylinder group connected to a second turbine through a second exhaust line, the second turbine parallel to the first turbine, a first compressor downstream of a second compressor arranged in series along an intake system, and a connecting line connecting the first exhaust line to the second exhaust line. The connecting line branches off from the first exhaust line upstream of the first turbine and connects to the second exhaust line upstream of the second turbine. A controller may regulate exhaust flow through the above described system responsive to engine operating conditions by regulating the position of valves along the first exhaust line and the second exhaust line, engaging or disengaging the turbochargers, depending on engine operating parameters.

In another example, exhaust flow may be regulated through a system including a first group of cylinders each having a respective first exhaust valve, a second group of cylinders each having a respective first exhaust valve and a respective second exhaust valve, a first exhaust line with a first turbine of a first turbocharger connected to the first group of cylinders through the respective first exhaust valves, a second exhaust line with a second turbine of a second turbocharger connected to the second group of cylinders through the respective second exhaust valves, a first compressor of the first turbocharger arranged along a first intake line and a second compressor of the second turbocharger along a second intake line, wherein the first compressor is parallel to the second compressor, and a controller controlling exhaust flow by actuating the first exhaust valves and the second exhaust valves. The first exhaust valves may each have a larger cross-sectional area than the second exhaust valves. The first group of cylinders may include all cylinders of the engine and the second group of cylinder may include two outer cylinders of the first group of cylinders.

In another example, a supercharged internal combustion engine may include a first low-pressure turbocharger with a first turbine and a first compressor, and a second high-pressure turbocharger with a second turbine and a second compressor, the first turbocharger and second turbocharger arranged in series along an exhaust section and an intake section of the engine, with the second turbine arranged upstream of the first turbine in the exhaust section and the second compressor arranged downstream of the first compressor in the intake system, a first bypass line with a first valve, the first bypass line branching off from a first junction point from the exhaust section between the first turbine and the second turbine and opening into the intake section downstream of the first compressor and upstream of the second compressor, a second bypass line with a second valve, the second bypass line branching off from the exhaust section upstream of the second turbine and opening back into the exhaust section again between the first turbine and the second turbine, a third bypass line with a third valve, the third bypass line connecting the intake system from upstream of the first compressor to upstream of the second compressor, at least one exhaust-gas aftertreatment system along the exhaust section downstream of the first turbine and the second turbine, and a charge-air cooler arranged in the intake system between the first compressor and the second compressor.

These arrangements of the supercharged internal combustion engine with two superchargers arranged in series may generate adequate boost pressure to meet torque demand at different engine operating conditions, including at various engine load and engine speed conditions, thereby increasing supercharger efficiency. Additionally, flowing the exhaust gas, under all operating conditions, through at least one turbine, while bypassing a turbine at least during some conditions, before flowing to a downstream aftertreatment device may enable the aftertreatment device to quickly reach light-off temperature, especially during cold start conditions, while still achieving desired boost.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a second embodiment of the internal combustion engine.

FIG. 10 schematically shows a fourth embodiment of the internal combustion engine.

FIG. 12 schematically shows a fifth embodiment of the internal combustion engine.

FIG. 13 schematically shows a sixth embodiment of the internal combustion engine.

DETAILED DESCRIPTION

Figure 1:
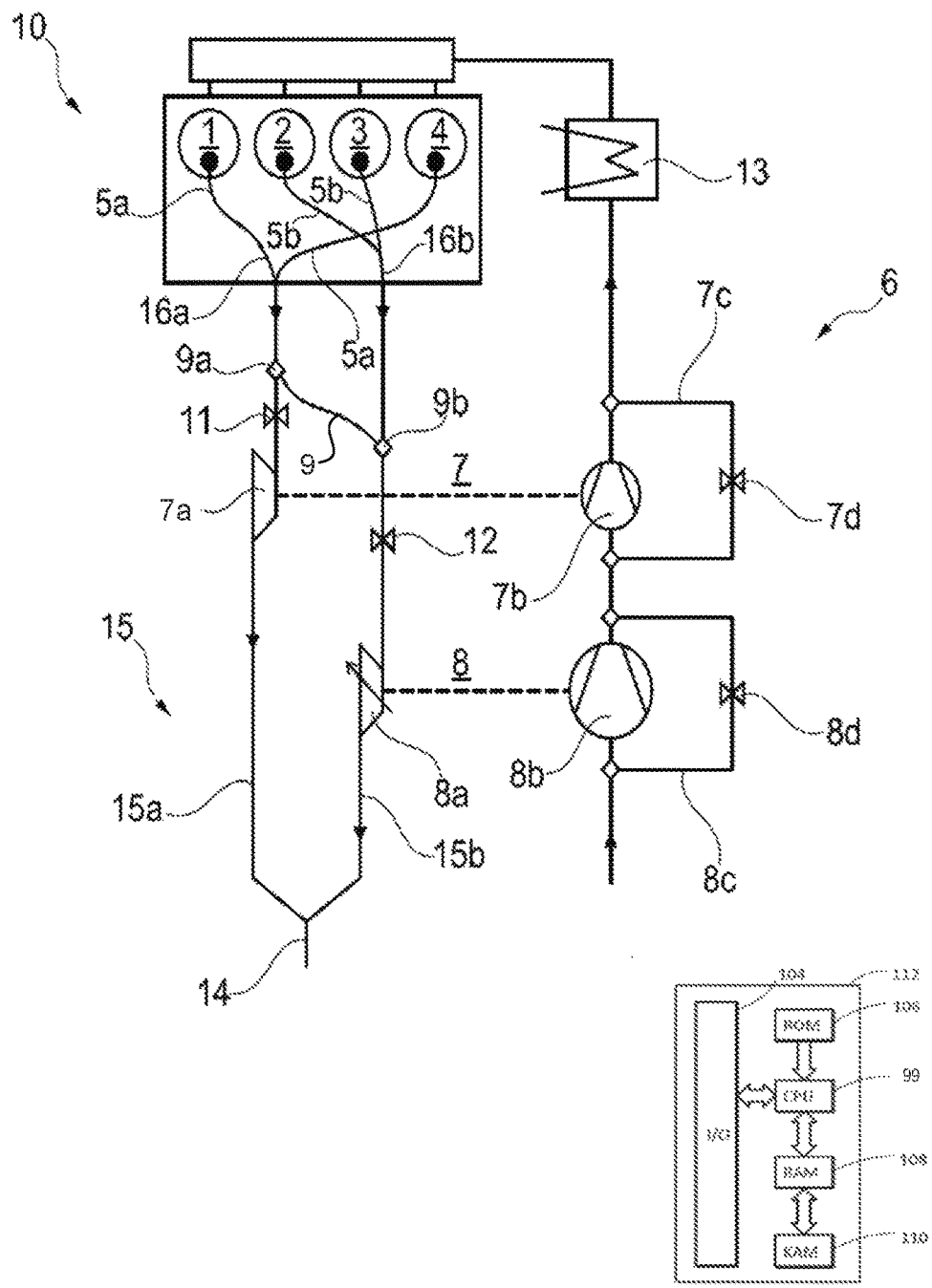
FIG. 1 schematically shows a first embodiment of the internal combustion engine.

An approach to a solution for dethrottling an Otto-cycle engine is offered by cylinder deactivation, that is to say the deactivation of individual cylinders in certain load ranges. The efficiency of the Otto-cycle engine in part-load operation may be increased, by means of a partial deactivation. Deactivation of one cylinder of a multi-cylinder internal combustion engine increases the load on the other cylinders, which remain in operation, if the engine power remains constant, such that the throttle flap may be opened further in order to introduce a greater air mass into the cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads. The cylinders which remain in operation during the partial deactivation furthermore exhibit enhanced mixture formation owing to the greater air mass or mixture mass supplied.

Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, exhibit greater efficiency, that is to say lower fuel consumption, than Otto-cycle engines in which the load is adjusted by means of throttling or quantity regulation with regard to the charging of the cylinders, there is, even in the case of diesel engines, potential for enhancing fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be increased, by means of a partial deactivation, because, even in the case of the diesel engine, in the case of constant engine power the deactivation of at least one cylinder of a multi-cylinder internal combustion engine increases the load on the other cylinders still in operation, such that the cylinders operate in regions of higher loads, in which the specific fuel consumption is lower. The load collective in part-load operation of the diesel engine is shifted toward higher loads. With regard to the wall heat losses, the same advantages are attained as in the case of the Otto-cycle engine, for which reason reference is made to the corresponding statements given.

In the case of diesel engines, the partial deactivation is also intended to prevent the fuel-air mixture from becoming too lean as part of the quality regulation in the event of decreasing load as a result of a reduction of the fuel quantity used.

The multi-cylinder internal combustion engines with partial deactivation described previously, and the associated methods for operating the internal combustion engines, nevertheless have considerable potential for increase in efficiency, as will be explained below on the basis of an engine as an example.

Figure 2:
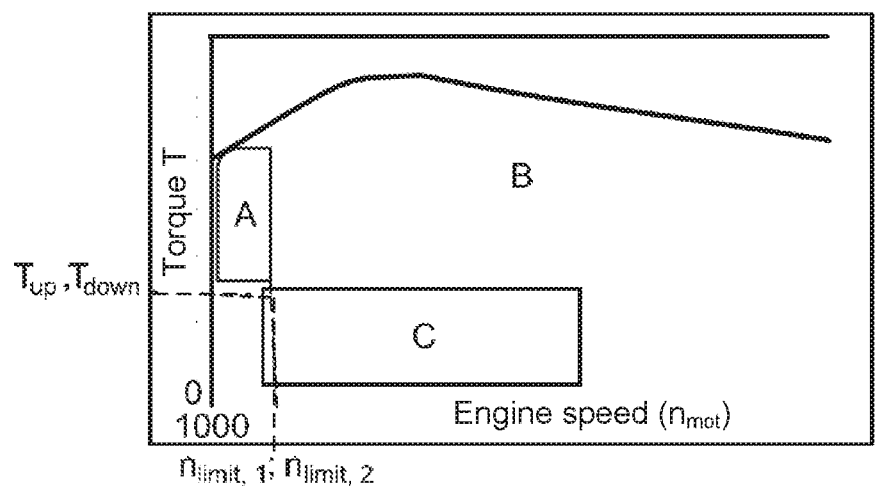
FIG. 2 schematically shows an engine characteristic map of the first embodiment.
Figure 3:
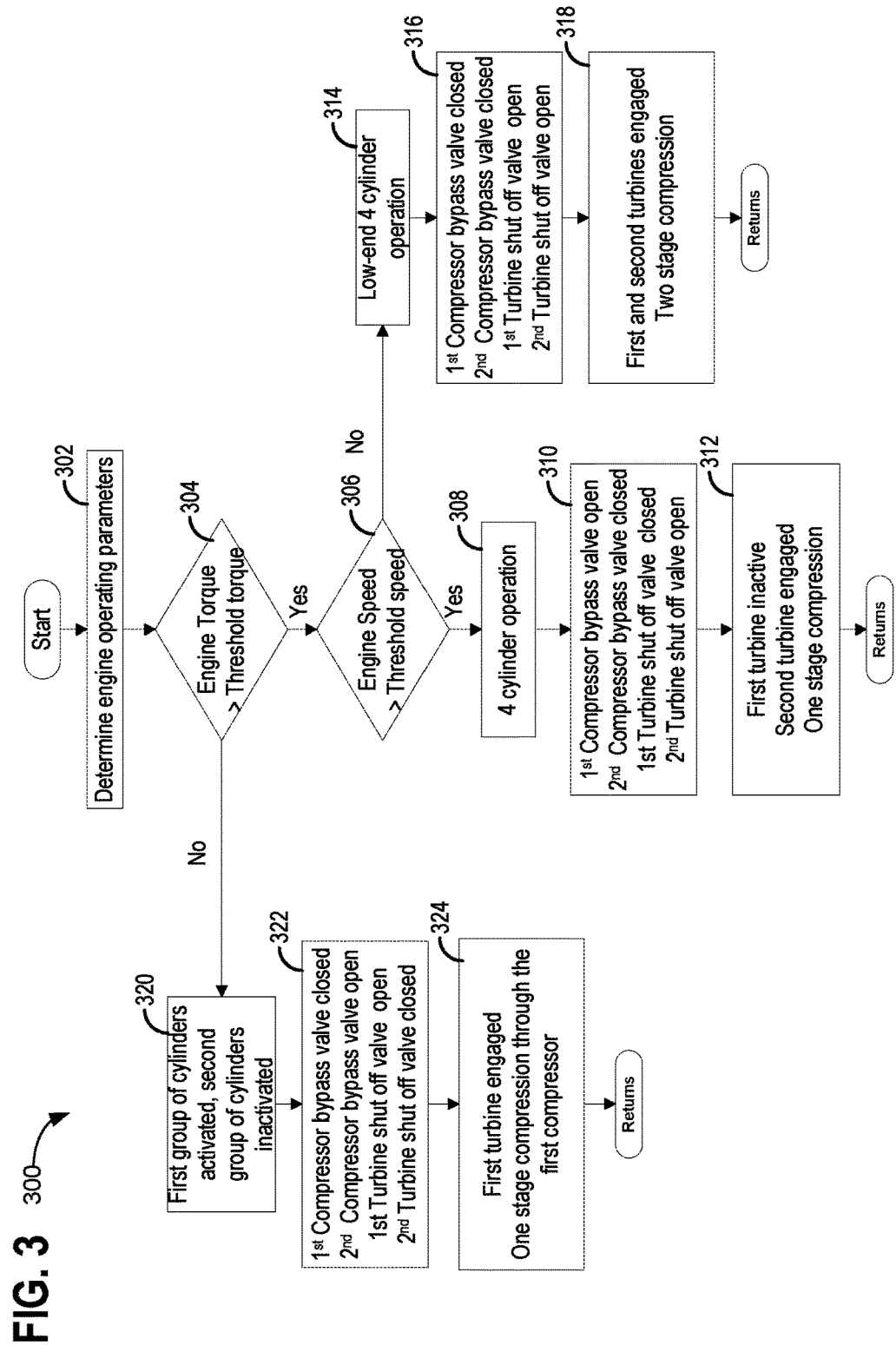
FIG. 3 shows a method for operating the first embodiment of FIG. 1.
Figure 5:
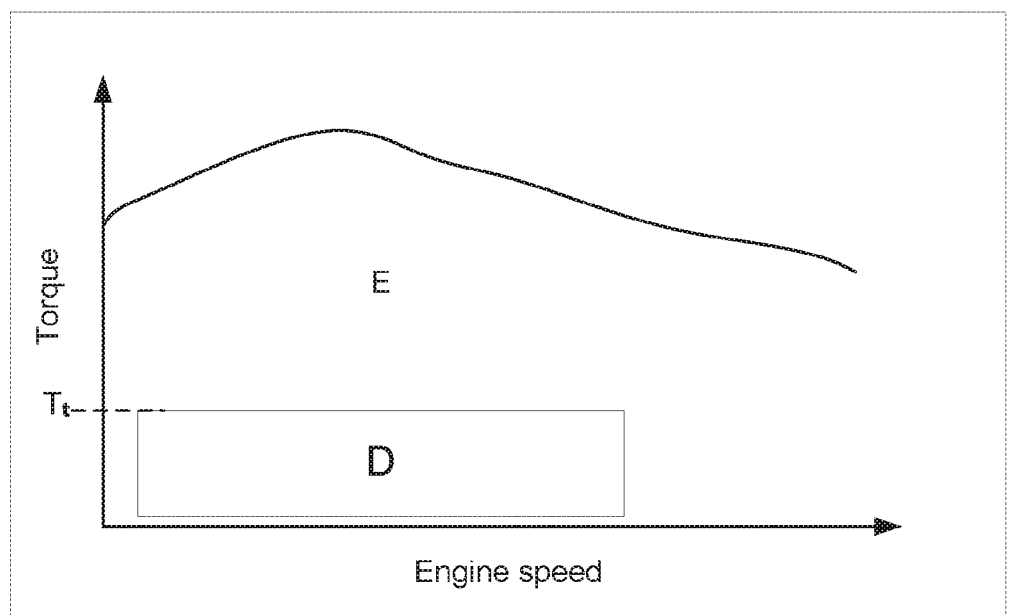
FIG. 5 schematically shows an engine characteristic map of the second embodiment.
Figure 6:
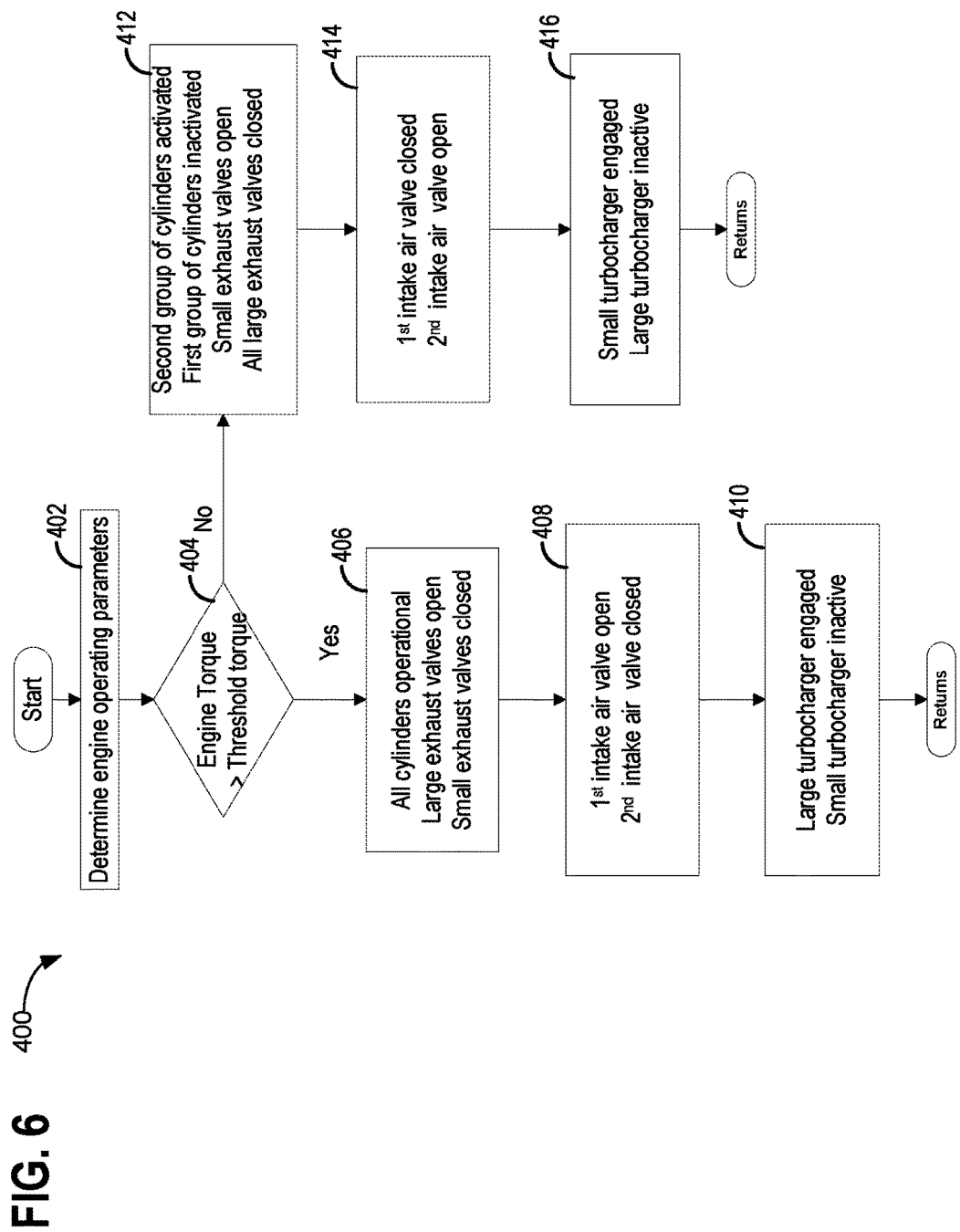
FIG. 6 shows a method for operating the second embodiment of the internal combustion engine of FIG. 4.
Figure 7:
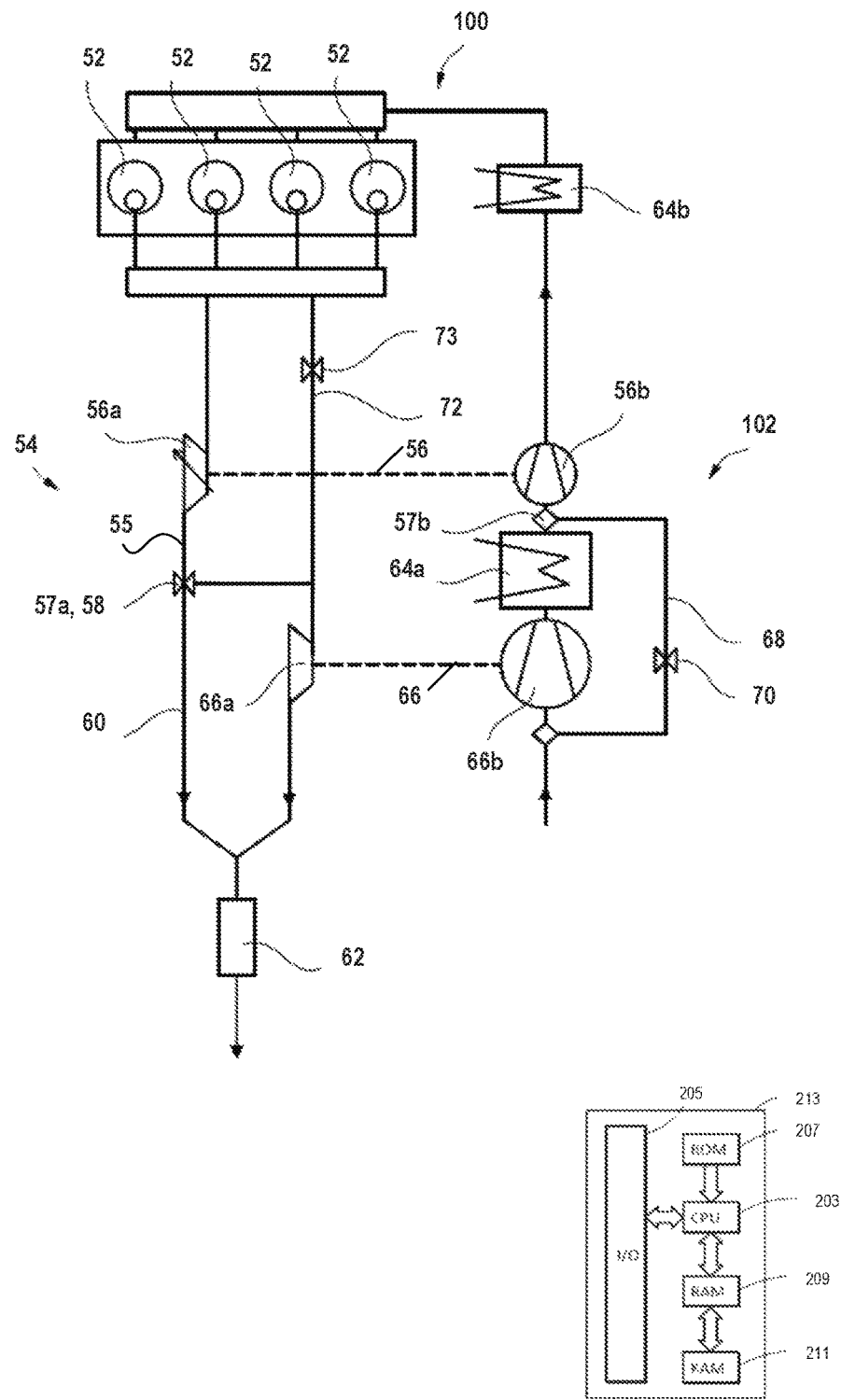
FIG. 7 schematically shows a third embodiment of the internal combustion engine.
Figure 8:
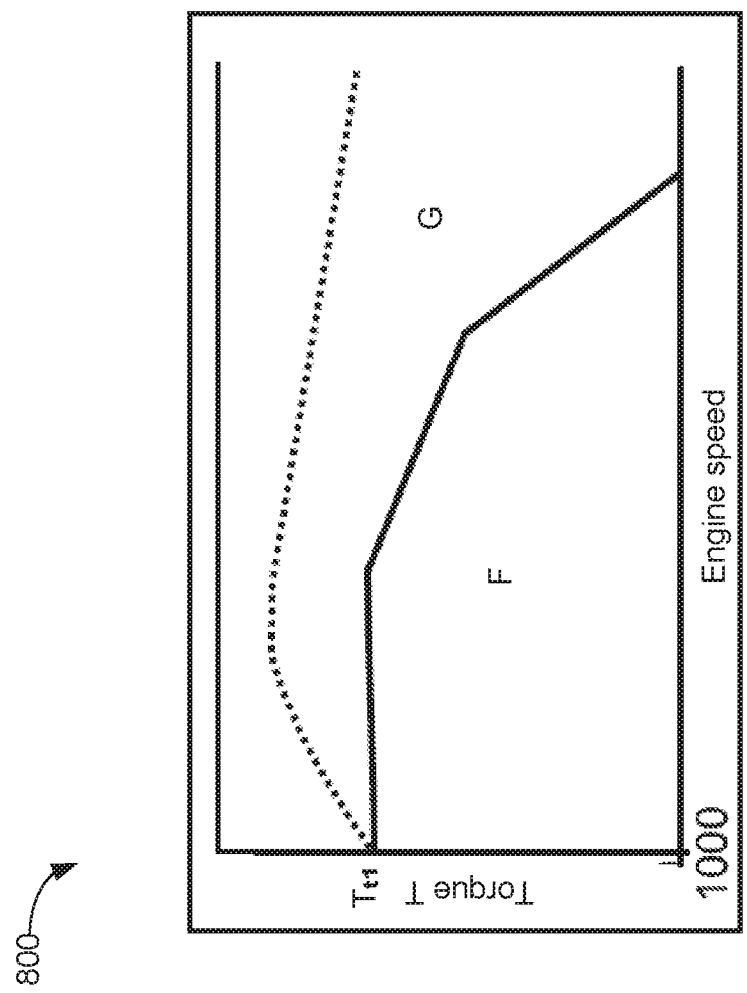
FIG. 8 schematically shows the engine characteristic map of the third embodiment.
Figure 9:
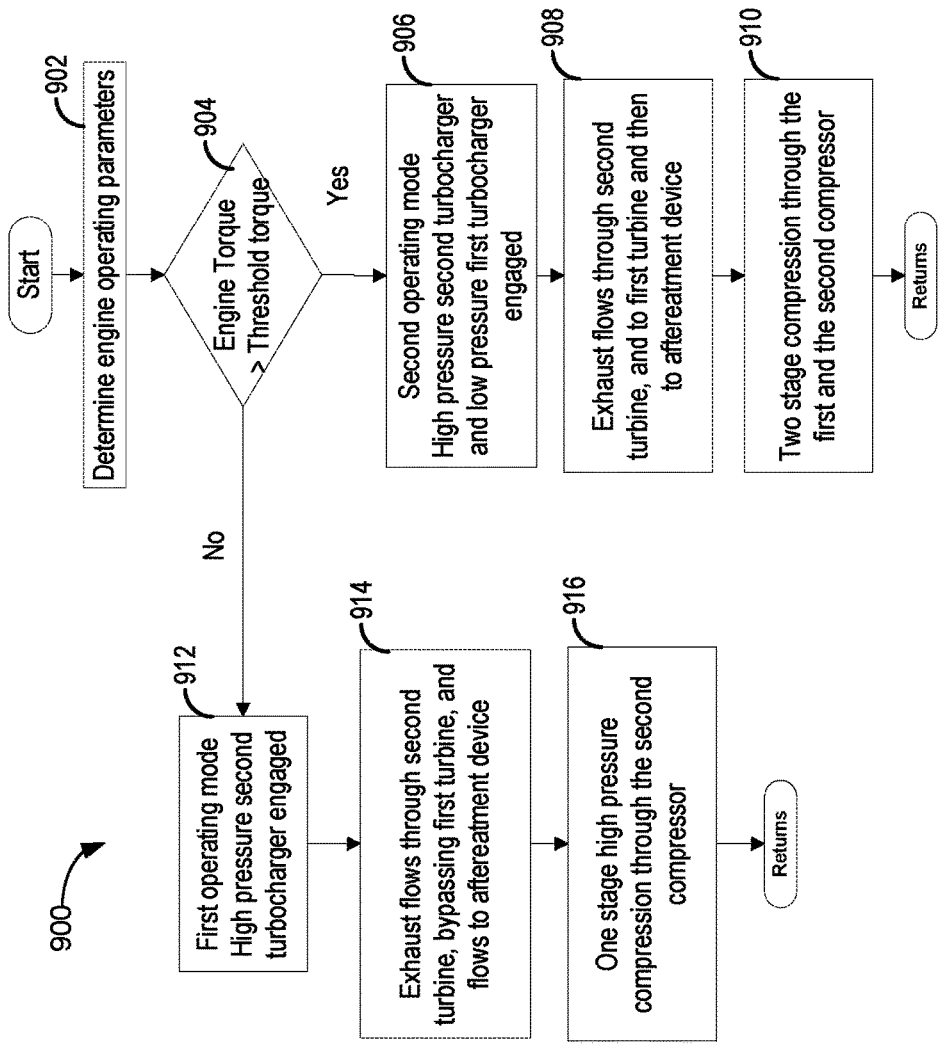
FIG. 9 shows a method for operating the third embodiment of the internal combustion engine of FIG. 7.
Figure 11:
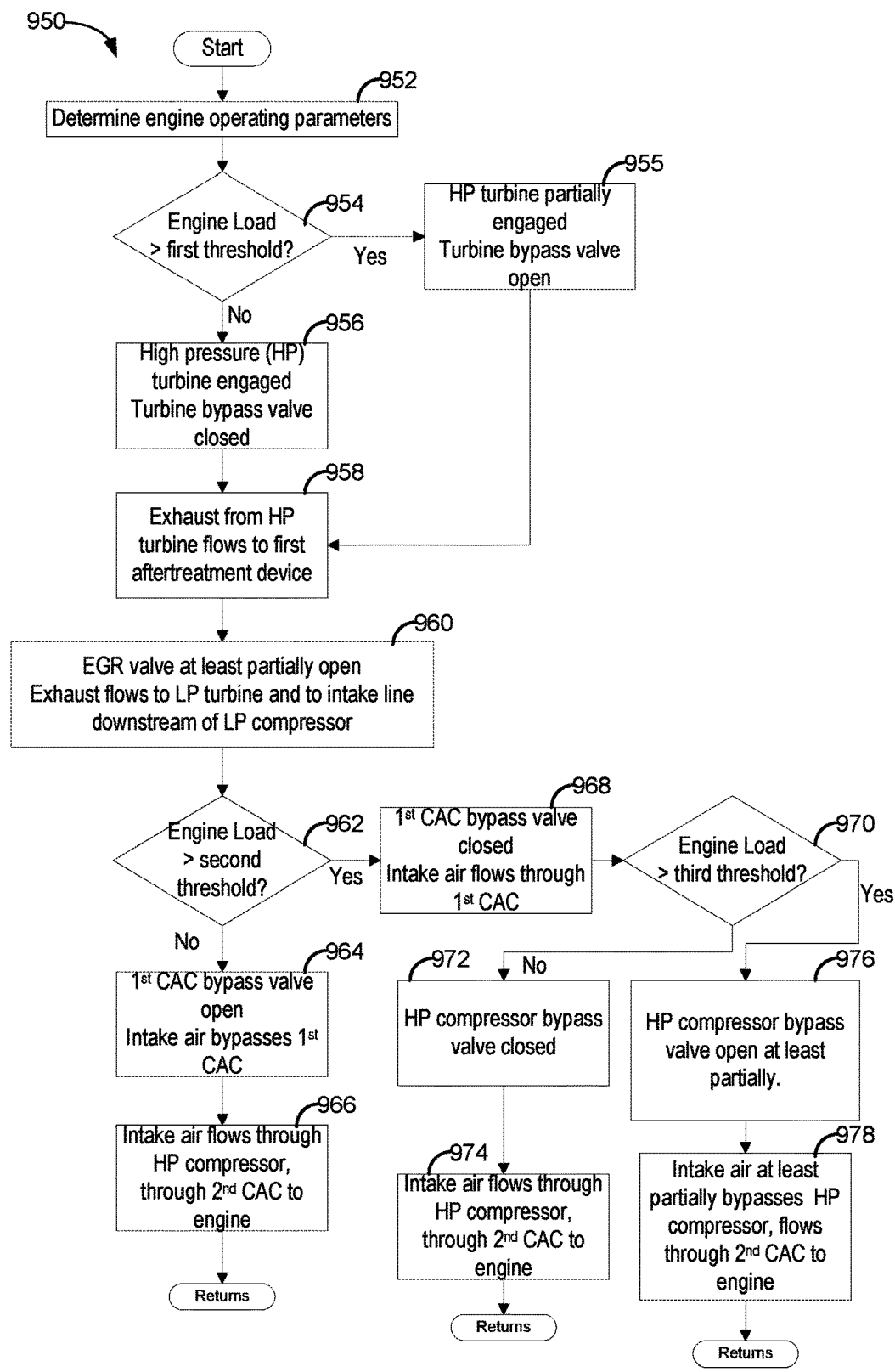
FIG. 11 shows a method for operating the fourth embodiment of the internal combustion engine of FIG. 10.
Figure 14:
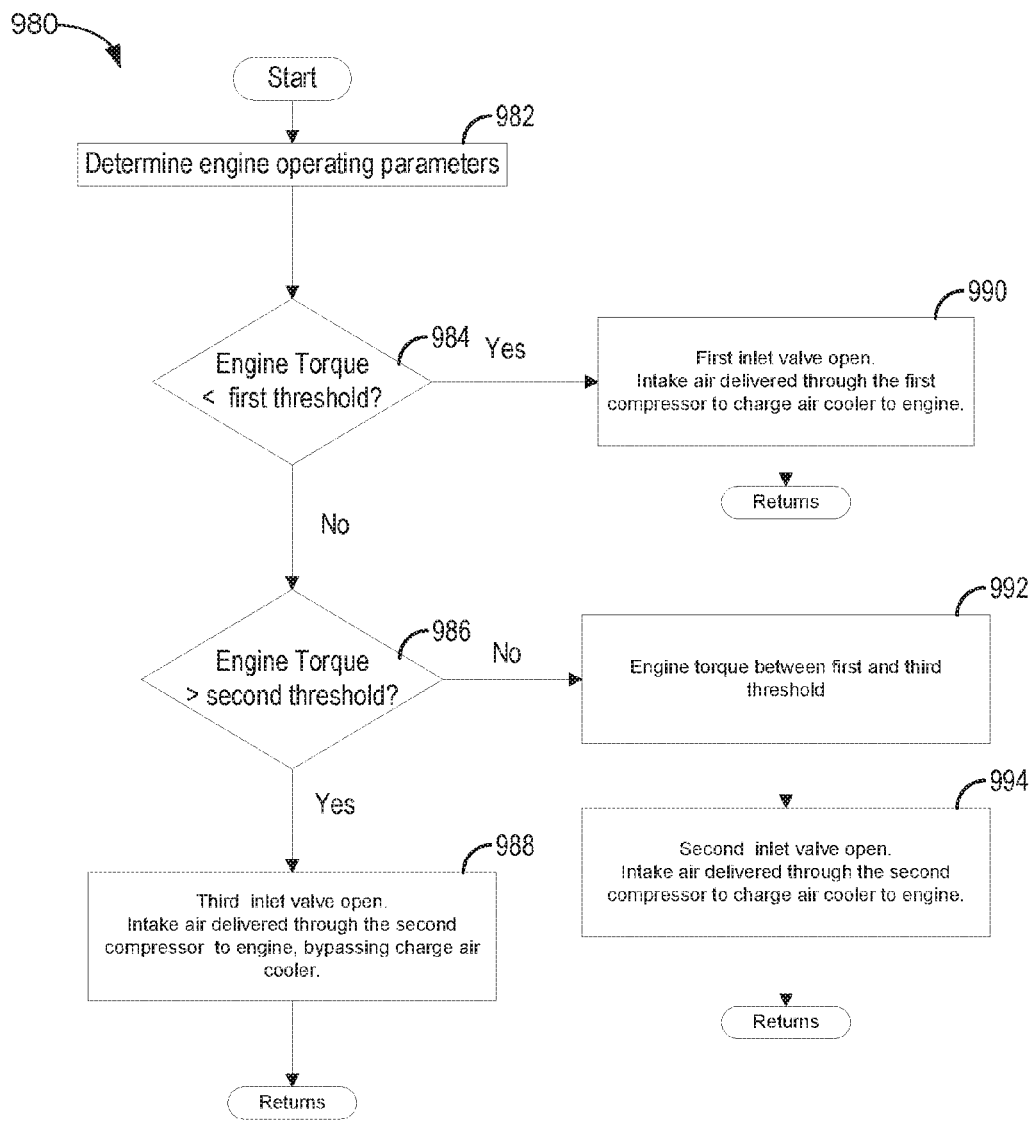
FIG. 14 shows a method for operating the internal combustion engine of FIGS. 12 and 13.

The following description relates to systems and methods for operating an engine coupled to at least two exhaust-gas turbochargers. The embodiment illustrated in FIG. 1 shows an engine where cylinder activation and deactivation, based on engine operating parameters, is used for providing adequate boost pressure to the engine. FIG. 2 illustrates an example operating map and FIG. 3 illustrates an operating method for the engine of FIG. 1. A second embodiment showing a cylinder deactivation or activation system based on engine operating parameters is illustrated in FIG. 4, and FIG. 5 shows an engine operation map of the second embodiment. A method for regulating flow of exhaust through the engine of FIG. 4 is illustrated in FIG. 6. FIGS. 7-9 illustrate a third embodiment of an engine system, an engine operation map and a method respectively, where two exhaust gas turbochargers are present in series and coupled to the engine to regulate boost pressure by either high pressure turbocharging or by low pressure turbocharging. FIG. 10 illustrates a fourth embodiment of the internal combustion engine and the FIG. 11 shows a method for operating the fourth embodiment. FIGS. 12 and 13 illustrate a fifth and a sixth embodiment of the internal combustion engine and FIG. 14 shows a method for operating the embodiments of FIGS. 12 and 13.

FIGS. 1, 4, 6, 10, 12, and 13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example FIG. 1 schematically shows a first embodiment of the supercharged internal combustion engine 10 which is equipped with a first exhaust-gas turbocharger and a second exhaust gas turbocharger 8. Each of the first exhaust-gas turbocharger 7 and the second exhaust-gas turbocharger 8 comprises a first turbine 7a, and a second turbine 8a, respectively, arranged in an exhaust-gas discharge system 15 and a first compressor 7b, and a second compressor 8b arranged in an intake system 6. The hot exhaust gas expands in the first turbine 7a, and the second turbine 8a with a release of energy. The first compressor 7b, and the second compressor 8b compress the charge air which is supplied to the cylinders 1, 2, 3, 4 via the intake system 6, a charge-air cooler 13 and plenum, as a result of which supercharging of the internal combustion engine 10 is realized.

The internal combustion engine is a four-cylinder in-line engine 10 in which the four cylinders 1, 2, 3, 4 are arranged along the longitudinal axis of the cylinder head, that is to say in a line. The four cylinders 1, 2, 3, 4 are configured so as to form two groups with in each case two cylinders 1, 2, 3, 4, wherein the two inner cylinders 2, 3 form a second group, the cylinders 2, 3 of which are in the form of load-dependently switchable cylinders 2, 3 which are deactivated during the course of a partial deactivation, and the two outer cylinders 1, 4 form a first group, the cylinders 1, 4 of which are operational even during partial deactivation.

Each cylinder 1, 2, 3, 4 has two outlet openings which are adjoined by exhaust lines 5a, 5b for the discharge of the exhaust gases via the exhaust-gas discharge system 15, wherein, for simplicity, one outlet opening is illustrated per cylinder 1, 2, 3, 4. The exhaust lines 5a, 5b of the cylinders 1, 2, 3, 4 of each cylinder group merge in each case to form overall first exhaust line 15a and a second exhaust line 15b such that a first exhaust manifold 16a, and a second exhaust manifold 16b is formed. The first exhaust line 15a and the second exhaust line 15b in turn merge to form a common exhaust line 14. The first exhaust manifold 16a is connected via a connecting line 9 to the second exhaust manifold 16b, the connecting line 9 branching off from the first exhaust manifold 16a so as to form a first junction point 9a and opening into the second exhaust manifold 16b so as to form a second junction point 9b.

The first turbine 7a of the first exhaust-gas turbocharger 7 is arranged in the first exhaust line 15a of the first cylinder group, and the second turbine 8a of the second exhaust-gas turbocharger 8 is arranged in the second overall exhaust line 15b of the second cylinder group, such that, in the present case, the first turbine 7a is or remains activated during partial deactivation and serves to generate the required charge pressure. The first turbine 7a of the first exhaust-gas turbocharger 7 has, in the present case, a fixed turbine geometry, and the second turbine 8a of the second exhaust-gas turbocharger 8 has a variable turbine geometry.

The first compressor 7b of the first exhaust-gas turbocharger 7 is arranged in the intake system 6 downstream of the second compressor 8b of the second exhaust-gas turbocharger 8, wherein the charge-air cooler 13 is arranged downstream of the compressors. A first bypass line 7c branches off from the intake system 6 between the first compressor 7b and the second compressor 8b, and the first bypass line 7c opens into the intake system 6 again downstream of the first compressor 7b, and in which first bypass line there is arranged a first shut-off element 7d. A second bypass line 8c branches off from the intake system 6 upstream of the second compressor 8b, which second bypass line opens into the intake system 6 again between the first compressor 7b and the second compressor 8b, and in which second bypass line there is arranged a second shut-off element 8d.

The first bypass line 7c is utilized if all of the cylinders 1, 2, 3, 4 of the internal combustion engine 10 are operational cylinders 1, 2, 3, 4 and the second, relatively large second turbine 8a performs the compressor work, that is to say single-stage compression or supercharging is performed using the second exhaust-gas turbocharger 8. The first compressor 7b then constitutes a flow resistance for the charge air compressed by the second compressor 8b. The first bypass line 7c then enables the first compressor 7b to be bypassed, thus permitting dethrottling of the intake system 6. A first turbine-shut-off element 11 arranged between the first turbine 7a and the first junction point 9a is in this case preferably closed, whereby the first turbine 7a is deactivated.

The second bypass line 8c serves for the drawing-in of fresh air in situations in which the first, relatively small turbine 7a performs the compressor work, that is to say single-stage compression or supercharging is performed using the first exhaust-gas turbocharger 7, specifically during the partial deactivation. The second compressor 8b then merely constitutes a flow resistance for the fresh air drawn in by the first compressor 7b. A second bypass line 8c then enables the second compressor 7b to be bypassed, thus permitting dethrottling of the intake system 6. A second turbine-shut-off element 12 arranged between the second turbine 8a and the second junction point 9b is preferably closed during the partial deactivation.

The engine system may further include a control system. The control system may include a controller 112. The controller 112 is shown in FIG. 1 as a microcomputer, including microprocessor unit 99, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 10, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP. One or more temperature sensors (not shown) may be positioned in the exhaust to measure exhaust gas temperature, exhaust-gas aftertreatment system temperature, or other temperatures.

Storage medium read-only memory 106 can be programmed with computer readable data representing instructions executable by processor 99 for performing the methods described below as well as other variants that are anticipated but not specifically listed. Example methods are described with reference to FIG. 3.

The controller 112 receives signals from the various sensors of FIG. 1 and employs the various actuators of FIG. 1 to adjust engine operation based on the received signals and instructions stored on a memory of the controller. For example, the controller may receive feedback from one or more sensors to determine engine load, engine speed, and/or aftertreatment device temperature (such as feedback from MAF, MAP, PIP sensors, and temperature sensors) and may then adjust an actuator coupled to the first turbine shut-off element 11 and the second turbine-shut-off element 12 to adjust the position of the shut-off elements.

FIG. 2 schematically shows an engine characteristic map 200 of the first embodiment as per FIG. 1. During the operation of the internal combustion engine 10, the two switchable cylinders 2, 3 of the second group are switched in a manner dependent on the load T of the internal combustion engine 10, wherein the switchable cylinders 2, 3 are deactivated if a predefinable load $T_{down}$ is undershot and are activated if a predefinable load $T_{up}$ is exceeded. The loads $T_{down}$ and $T_{up}$ predefined for the undershooting and exceedance respectively may, in the present case, be of equal magnitude. The operating mode C denotes the characteristic map region of partial deactivation.

If all of the cylinders 1, 2, 3, 4 of the internal combustion engine 10 are operational cylinders 1, 2, 3, 4, both the turbine 7a of the first exhaust-gas turbocharger 7 and the turbine 8a of the second exhaust-gas turbocharger 8 are used for generating the charge pressure, in the context of a two-stage compression, for as long as engine speed $n_{mot}$ of the internal combustion engine 10 is lower than a predefinable engine speed $n_{limit,1}$. The operating mode A denotes this characteristic map region.

By contrast, if the engine speed $n_{mot}$ of the internal combustion engine 10 is higher than a predefinable engine speed $n_{limit,2}$, the first turbine 7a is deactivated, and the turbine 8a of the second exhaust-gas turbocharger 8 is used, in the context of a single-stage compression, for generating the charge pressure, in accordance with the operating mode B. The engine speed $n_{limit,1}$ and $n_{limit,2}$, may be of equal magnitude.

FIG. 3 illustrates a method 300 for operating the four cylinder engine coupled to two turbochargers. In one example, the method 300 may be used to operate the engine 10, illustrated in FIG. 1, including the cylinders 1, 2, 3, and 4 of the internal combustion engine 10. The outer cylinders 1, 4 are the outer cylinder forming the first group of cylinders and the middle cylinders 2, 3 are the second group of cylinders. The engine 10 includes the first exhaust-gas turbocharger 7 with the first turbine 7a and the first compressor 7b, and the second exhaust-gas turbocharger 8, with the second turbine 8a and the second compressor 8b. The first turbine and the second turbine may be arranged in parallel along the exhaust-gas discharge system 15 and the first compressor and the second compressor may be arranged in series in the intake system 6, as illustrated in FIG. 1. Exhaust may flow to the first turbine 7a through the first turbine shut-off element 11 and to the second turbine 8a through the second turbine shut-off element 12. The first compressor may be bypassed through the first bypass line with the first compressor shut-off element 7d and the second compressor may be bypassed through the second bypass line with the second compressor shut-off element 8d. The position of the above stated valves may be regulated by the method 300 to determine exhaust flow path, depending on engine operating parameters.

Instructions for carrying out method 300 may be executed by a controller, for example, the controller 112 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302 by assessing engine operating parameters, including but not limited to, engine load, engine speed, boost pressure (which may be a measurement of intake manifold pressure relative to ambient pressure, for example), ATS temperature, and other parameters. The method 300 then proceeds to 304 to assess if the engine torque is above a threshold torque, for example greater than 30% or 50% maximum rated torque, and/or during acceleration, during uphill driving, etc. If the engine torque is not above the threshold torque, the method 300 proceeds to 320 to inactivate a second group of cylinders (for example, cylinders 2, 3, of FIG. 1) as will be described below. If the engine torque is above the threshold torque at 302, the method proceeds to 306 and determines if the engine speed is above a threshold speed. In one example, the threshold engine speed may be 1500 RPM. If the engine speed is above the threshold speed, the method proceeds to 308.

At 308, all four cylinders of the engine are in operational mode. At 310, the first turbine shut-off element may be closed, the second turbine shut-off element may be open, the first compressor bypass element may be open, and the second compressor bypass element may be closed. At 312, the first turbine may be inactive and the second turbine may be engaged. The second turbine may receive exhaust gas from the second group of engine cylinders through the second exhaust line. The second turbine may also receive exhaust gas from the first group of cylinders through the first exhaust manifold and to the second exhaust line via the connecting line and then through the open second turbine shut-off element to the second turbine (for example, exhaust flows from the cylinders 1,4 through the connecting line 9 to the second turbine 8a). Thus, the second turbine may receive exhaust gas from all the cylinders. The second turbine may be a variable geometry turbine that may be adjusted based on boost pressure, exhaust mass flow, engine speed and load, etc., to provide desired boost. The second turbine may then drive the second compressor, which may direct the intake air to the engine after one-stage compression by the second compressor. Intake air may bypass the first compressor through the open first compressor bypass element, thereby providing the required boost to meet the engine load and speed demands, for example, during the operating mode B, illustrated in FIG. 2. The second turbine and the second compressor may provide boost to the engine. The method 300 then returns.

At 306, if the engine speed is not above the threshold speed, the method 300 proceeds to 314, where all cylinders are in low-end operation mode. In one example, the low-end operation mode may be used during uphill driving at low engine speeds, where torque demand may be high (for example, above the threshold torque). At 316, the first turbine shut-off element may be open, the second turbine shut-off element may be open, the first compressor bypass element may be closed, and the second compressor bypass element may be closed. At 318, both the first turbine and the second turbine may be engaged as exhaust from the first group of cylinders may flow through the open first turbine shut-off element to the first turbine and exhaust from the second group of cylinders may flow through the second open turbine shut-off element to the second turbine. The first turbine may be a fixed geometry turbine and the second turbine may be a variable geometry turbine. In some examples, the position of the first turbine shut-off element may be adjusted to meet desired boost and prevent surge or overspeed of the first turbocharger. The intake air may be directed to the engine after two-stage compression by the first compressor and the second compressor, for example, during the operating mode A, illustrated in FIG. 2. The method 300 then returns.

At 302, if the engine torque is not above the threshold torque, the method 300 proceeds to 320, where the first group of cylinders is active while the second group of cylinders are inactivated. In one example, the first cylinder group may include the cylinders 1 and 4 and the second group of cylinders may include the cylinders 2 and 3, illustrated in FIG. 1. At 322, the first turbine shut-off element may be open, the second turbine shut-off element may be closed, the first compressor bypass element may be closed, and the second compressor bypass element may be open. At 324, the first turbine may be engaged and receive exhaust from the first group of cylinders through the open first turbine shut-off element, and may in turn drive the first compressor to flow compressed intake air to the engine after one-stage compression, for example, during the operating mode C, illustrated in FIG. 2. The first turbine and the first compressor may provide boost to the engine. The method 300 then returns.

Thus, operating the engine by engaging the first turbocharger and/or the second turbocharger over a wide engine load and engine speed range may provide the required boost pressure to the engine to meet the torque demand. The first turbocharger may be matched (e.g., sized) for two cylinder operation, and thus will be able to deliver the requested boost pressure and air flow for the engine to be operated with just two cylinders fired. This operation in two cylinder mode may be maintained from zero to full load cylinder-IMEP. This would equal approximately zero to 50% load of the full four cylinder engine. When switching back to four cylinder operation, the second turbocharger may be accelerated by closing the recirculation valve and subsequently opening the shut off valve (similar to the operation of a parallel sequential boosting system).

FIGS. 4-6 illustrate a second embodiment of an internal combustion engine of a motor vehicle for improving the exhaust gas conduct and the air intake for a motor vehicle with internal combustion engine with cylinder cut-off, as will be described below.

The internal combustion engine may include multiple cylinders, an intake air section, an exhaust section comprising a first exhaust pipe and a first exhaust gas turbocharger. The first exhaust gas turbocharger may include a first exhaust gas turbine arranged in the first exhaust pipe and a first compressor which is arranged in the intake air section and connected to the first exhaust gas turbine in a torque-transmitting manner. The cylinders each may include a first exhaust valve, which may be connected to the first exhaust pipe in a fluid-conducting manner. A first group of the cylinders may be deactivatable. According to the embodiment, the exhaust section may include a second exhaust pipe and a second group of the cylinders each comprises a second exhaust valve, which is connected to the second exhaust pipe in a fluid-conducting manner. The motor vehicle additionally may include a second exhaust gas turbocharger with a second exhaust gas turbine arranged in the second exhaust pipe and a second compressor which is arranged in the intake air section and connected to the second exhaust gas turbine in a torque-transmitting manner.

Thus, separate exhaust gas routes are advantageously created for an operation in which all cylinders of the internal combustion engine are in the working mode and for an operation in which cylinders of the first group are deactivated and in the cut-off mode. The exhaust gas routing can thus be adapted to the different operating states. An exhaust section for an internal combustion engine with cylinder cut-off is provided, which manages to get by without special valves.

When all cylinders are in the working mode, energy may thus be extracted from the exhaust gas by means of the first exhaust gas turbine. During a cylinder cut-off, when cylinders of the first group are in the cut-off mode, energy can be extracted from the exhaust gas by means of the second exhaust gas turbine.

In one example, the first exhaust gas turbine may have a variable turbine geometry. The variable turbine geometry in this case may serve for improving the behavior of the turbocharger at different rotational speed and load conditions and for improving the response behavior of the internal combustion engine. In another example, the second exhaust gas turbine may have a non-variable turbine geometry.

The exhaust gas turbine may thus be engaged depending on the states that are present during the cylinder cut-off and works in an optimal operating point. The range, in which a cylinder cut-off can be performed is enlarged through the super-charging by means of the second compressor and the power of the internal combustion engine which is thereby enhanced. Thus, the motor vehicle may be operated more efficiently.

In a further embodiment of the motor vehicle, the intake air section may include a first intake air pipe and a second intake air pipe. The first compressor may be arranged in the first intake air pipe and the second compressor is arranged in the second intake air pipe. Elaborate arrangements with special valves may thus be omitted.

In another embodiment of the motor vehicle, the first exhaust valve may have a larger flow cross section than the second exhaust valve. The exhaust valves may thus be optimized for the states which are present during their intended operations.

In one embodiment of the motor vehicle, the motor vehicle may include a charge air cooler arranged in the intake air section. The charge air cooler cools the intake air, by way of which the charge of the cylinders can be increased. In a further embodiment of the motor vehicle, the internal combustion engine may include four of the cylinders arranged in series, wherein the two inner cylinders are deactivatable. In particular the four-cylinder inline engine with cylinder cut-off can be optimized with respect to the efficiency and the response behavior.

The embodiment is explained in more detail below with reference to FIGS. 4-6.

In FIG. 4, the motor vehicle 150 is schematically shown in a configuration that includes an internal combustion engine 40 for driving the motor vehicle 150. In addition, the motor vehicle 150 comprises an intake air section 48 to feed intake air 32 to the internal combustion engine 40 for its operation. For discharging exhaust gas 33 created during the operation of the internal combustion engine 40 the motor vehicle 150 comprises an exhaust section 50.

The exhaust section 50 comprises a first exhaust pipe 36 and a second exhaust pipe 37. The second exhaust pipe 37 is arranged operationally parallel with the first exhaust pipe 36. Both exhaust pipes 36, 37 thus have the same flow direction.

The internal combustion engine 40 comprises multiple cylinders 20, in particular four cylinders 20 arranged in series. Each of the cylinders 20 comprises a large exhaust valve 21, through which the exhaust gas 33 can be expelled from the cylinder 20 into the first exhaust pipe 36 of the exhaust section 50. The large exhaust valve 21 is thus connected to the first exhaust pipe 36 in a fluid-conducting manner. In one example, each of the cylinders 20 comprises at least one large exhaust valve 21.

The internal combustion engine 40 comprises a first group of cylinders, which are deactivatable. Deactivatable means a cutting-off of a subset of the cylinders (e.g., the first group of cylinders) while the operation of the internal combustion engine 40 is continued with the remaining cylinders which are not cut off. The cut-off cylinders in this case are in a cut-off mode and the non-cut-off cylinders in this case are in a first working mode. In the shown engine configuration, the inner two cylinders are assigned to the first group.

The internal combustion engine 40 additionally comprises a second group of cylinders, each of which comprises at least one small exhaust valve 22. Through the small exhaust valve 22, the exhaust gas 33 can be expelled from the cylinder 20 into the second exhaust pipe 37 of the exhaust section 50. The small exhaust valve 22 is thus connected to the second exhaust pipe 37 in a fluid-conducting manner. In the shown configuration, the outer cylinders are assigned to the second group.

The motor vehicle 150 includes, during a first operation, in which all cylinders 20 are in the working mode, to conduct the exhaust gas 33 through at least one large exhaust valve 21 each into the first exhaust pipe 36 and during a second operation, in which the cylinders of the first group are in the cut-off mode, to conduct the exhaust gas 33 out of the remaining cylinders in the working mode through at least one small exhaust valve 22 each into the second exhaust pipe 37. The large exhaust valves 21 and the small exhaust valves 22 are embodied switchably for this purpose. In one example, the large exhaust valve 21 has a larger flow cross section than the small exhaust valve 22.

The motor vehicle 150 furthermore comprises a low-pressure exhaust gas turbocharger 44. The low-pressure exhaust gas turbocharger 44 comprises a first exhaust gas turbine 42 arranged in the first exhaust pipe 36 and a first compressor 46 arranged in the intake air section 48. The first exhaust gas turbine 42 and the first compressor 46 are connected in a torque-transmitting manner for example by means of a first turbocharger shaft 30. The first exhaust gas turbine 42 in particular has a variable turbine geometry. Here, guide blades in the first exhaust gas turbine 42 are embodied adjustably.

In addition, the motor vehicle 150 comprises a high-pressure exhaust gas turbocharger 17. The high-pressure exhaust gas turbocharger 17 comprises a second exhaust gas turbine 18 arranged in the second exhaust pipe 37 and a second compressor 19 arranged in the intake air section 48. The second exhaust gas turbine 18 and the second compressor 19 are connected in a torque-transmitting manner for example by means of a second turbocharger shaft 31. The second exhaust gas turbine 18 has in particular a non-variable turbine geometry.

The low-pressure exhaust gas turbocharger 44 is preferably larger than the high-pressure exhaust gas turbocharger 17. In the intake air section 48, a charge air cooler 29 for cooling the intake air 32 is preferably arranged.

In the shown engine configuration, the intake air section 48 of the motor vehicle 150 comprises a first intake air pipe 34 and a second intake pipe 35 at least in regions. A first intake air pipe 34 and a second intake air pipe 35 in this case are arranged operationally parallel to one another. Both intake air pipes 34, 35 thus have the same flow direction.

The first compressor 46 is arranged in the first intake air pipe 34 and the second compressor 19 in the second intake air pipe 35. In order to be able to control intake air 32 flow, a first intake air valve 27 is arranged in the first intake air pipe 34. The first intake air valve 27 is configured to block flow through the first intake air pipe 34 and respectively to open the first intake air pipe 34 to at least a certain degree. A second intake air valve 28 is arranged in the second intake air pipe 35, and the second intake air valve 28 is configured to block flow through the second intake air pipe 35 and respectively to open the second intake air pipe 35 to at least a certain degree.

About the first compressor 46, a first bypass 23 is arranged, in which a first bypass valve 24 is positioned. The first bypass 23 conducts intake air 32 about the first compressor 46. The first bypass valve 24 is configured to block flow through the first bypass 23 and respectively to open the first bypass 23 to at least a certain degree.

About the second compressor 19 a second bypass 25 is arranged, in which a second bypass valve 26 is positioned. The second bypass 25 is conducts intake air 32 about the second compressor 19. The second bypass valve 26 is configured to block flow through the second bypass 25 and respectively to open the second bypass 25 at least to a certain degree.

Both the first exhaust pipe 36 and the second exhaust pipe 37 may unite downstream of the first exhaust gas turbine 42 and the second exhaust gas turbine 18. The two intake air pipes 34, 35 also unite downstream of the two compressors 46, 19.

The engine system of FIG. 4 may further include a control system 113, similar to the control system 112 of FIG. 1. The control system may include a controller 113. The controller 113 is shown in FIG. 4 as a microcomputer, including microprocessor unit 98, input/output ports 105, an electronic storage medium for executable programs and calibration values shown as read only memory chip 107 in this particular example, random access memory 109, keep alive memory 119, and a data bus. Controller 113 may receive various signals from sensors coupled to engine 2, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 113 from signal PIP. One or more temperature sensors (not shown) may be positioned in the exhaust to measure exhaust gas temperature, exhaust-gas aftertreatment system temperature, or other temperatures.

Storage medium read-only memory 107 can be programmed with computer readable data representing instructions executable by processor 98 for performing the methods described below as well as other variants that are anticipated but not specifically listed. Example methods are described with reference to FIG. 6.

The controller 113 receives signals from the various sensors of FIG. 4 and employs the various actuators of FIG. 4 to adjust engine operation based on the received signals and instructions stored on a memory of the controller. For example, the controller may receive feedback from one or more sensors to determine engine load, engine speed, and/or aftertreatment device temperature (such as feedback from MAF, MAP, PIP sensors, and temperature sensors) and may then adjust an actuator coupled to the first intake air valve 27 and the second intake valve 28 to adjust the position of the intake valves.

FIG. 5 schematically shows the engine characteristic map of the second embodiment as per FIG. 4. During the operation of the internal combustion engine 40, the cylinders 20 are switched (activated or deactivated) in a manner dependent on a torque T of the internal combustion engine 40. When the torque is below a threshold torque Tt, the first group of cylinders (two inner cylinders) are deactivated by closing off the large exhaust valves. The large exhaust valves are also closed in the second group of cylinders (two outer cylinders) while the small exhaust valves in the second group of cylinders are open. The combustion engine operates in the map region D, where the second group of cylinders flow exhaust through the second exhaust pipe 37 to the second exhaust gas turbine 18 of the high-pressure turbocharger 17. The second compressor 19 is engaged and flows compressed intake air to the combustion engine 40 through the second intake air valve 28. The low-pressure turbocharger 44 is inactive during operation of the engine in the map region D.

The combustion engine 40 operates with all cylinders 20 activated when the torque is above the threshold torque Tt. An operating mode E denotes the characteristic map region of when all cylinders are activated. During the operating mode E, the large valves 21 in each of the cylinders 20 is open while the small exhaust valves 22 in the second group of cylinders are closed. Exhaust from the cylinders 20 flows through the first exhaust pipe 36 to the first turbine 42 of the low-pressure turbocharger 44, and intake air flows through the first compressor 46 and through the first intake air valve 27 to the combustion engine 40. The high-pressure turbocharger 17 may not be active during this operating mode.

FIG. 6 illustrates a method 400 for operating the four cylinder engine coupled to two turbochargers. In one example, the method 400 may be used to operate the system illustrated in FIG. 4, including the cylinders 20 of the internal combustion engine 40. The engine 40 includes the low-pressure turbocharger 44, and the high-pressure turbocharger 17. The first turbine 42 and the second exhaust gas turbine 18 may be arranged in parallel along the exhaust section 50 and the first compressor 46 and the second compressor 19 may be arranged in parallel along the intake air section 48, as illustrated in FIG. 4. Method 400 may be carried out according to instructions stored in memory of a controller, such as controller 113 of FIG. 4, in combination with one or more sensors of the engine and/or actuators of the engine (e.g., the valves described above).

The method 400 begins by assessing engine operating parameters, including but not limited to, engine speed, engine torque, engine temperature, etc. at 402. The method 400 then proceeds to 404 to assess if the engine torque is above a threshold torque, such as greater than 30% maximum rated or torque and/or during acceleration, uphill driving etc. If the engine torque is above the threshold torque, the method 400 proceeds to 406, where all the cylinders are active and engaged. The large exhaust valve of all the cylinders are actuated open and closed to flow exhaust from all the cylinders to the exhaust system. The small valves in the second group of cylinders (outer cylinders) are closed. The method 400 proceeds to 408, where the first intake air valve is open and the second intake air valve is closed. This results in engagement of the large turbocharger at 410, where exhaust gas from all the cylinders flows to the first turbine of the large turbocharger and compressed intake air from the first compressor of the large turbocharger flows through the first intake air valve to the combustion engine, while the small turbocharger remains inactive.

At 404, if the engine torque is below the threshold torque, the method 400 proceeds to 412, where the second group of cylinders are activated and the first group of cylinders are deactivated. The large exhaust valves in each of the cylinders is closed and the small exhaust valve in the second group of cylinders is actuated open and closed. At 414, the first intake air valve is closed and the second intake air valve is open. The method 400 the proceeds to 416, where the small turbocharger is engaged such that exhaust from the first group of cylinders flows to the second turbine, driving the second compressor of the small turbocharger to flow compressed intake air through the second intake air valve to the combustion engine. The large turbocharger is not engaged.

Thus, the engine may operate in four-cylinder mode or may operate in cylinder deactivation mode, to provide the optimal boost pressure for generating a desired torque. During cylinder deactivation, only the small fixed geometry turbocharger is used to provide boost. This turbocharger is matched to operate with best efficiency in the mass flow and boost pressure ranges needed during cylinder deactivated mode. During 4-cylinder operation, the small exhaust valves (e.g., on the outer cylinders) are shut-off and only the large exhaust valves are operated on all cylinders. The second, smaller turbocharger is deactivated and boost is provided only by the first turbocharger, which is matched to operate at best efficiencies in the higher part load and full load range of a 4-cylinder engine. Switching between the operation modes is enabled by compressor shut-off and also recirculation valves. During switching in either direction all exhaust valves are active.

FIGS. 7-9 illustrate a supercharged internal combustion engine which generates high charge pressures and realizes fast heating of the exhaust-gas aftertreatment systems, especially during cold-start conditions.

The internal combustion engine according to the embodiment is equipped with two series-connectable turbines arranged in series in the exhaust-gas discharge system and two series-connectable compressors arranged in series in the intake system. The first compressor may be larger than the second compressor, because, with this configuration of the internal combustion engine or of the supercharging arrangement, the first compressor forms the low-pressure stage within the context of a two-stage compression, whereas the second compressor compresses the already pre-compressed air and thus constitutes the high-pressure stage.

The second turbine may serve as a high-pressure turbine, whereas the first turbine may serve for expanding an exhaust-gas flow which is already at a relatively low pressure and has a relatively low density owing to the fact that it has already passed through the high-pressure stage.

According to the embodiment, both the turbine of the high-pressure stage and the turbine of the low-pressure stage may have a bypass line through which exhaust gas can be conducted past the respective turbine.

During the warm-up phase, the exhaust-gas flow, preferably the entire exhaust-gas flow, is conducted through the second turbine, that is to say through the turbine of the high-pressure stage, and, downstream of the second turbine, is conducted past the first turbine and preferably back into the exhaust-gas discharge system via the first bypass line, which branches off from the exhaust-gas discharge system upstream of the first turbine so as to form a first junction point.

If the exhaust-gas stream is conducted through the relatively small second turbine in the warm-up phase, an adequately high charge pressure can be generated. At the same time, by virtue of the first turbine being bypassed, the larger turbine, which is to be regarded as a temperature sink, is eliminated, and the hot exhaust gas is supplied to the at least one exhaust-gas aftertreatment system, for which reason the system reaches its light-off temperature more quickly after a cold start or in the warm-up phase.

At the first junction point, at which the first bypass line branches off from the exhaust-gas discharge system, there is arranged a valve which, in the warm-up phase, in a first working position, blocks the exhaust-gas discharge system toward the first turbine and opens up the first bypass line, such that the exhaust-gas flow is conducted past the relatively large first turbine. This is a crucial advantage in relation to conventional embodiments in which the valve is arranged in the bypass line itself and in which, when the valve is open, exhaust gas can continue to flow into the turbine of the low-pressure stage. The turbine of the low-pressure stage then indeed also poses a certain resistance to flow. Nevertheless, a part of the exhaust-gas stream flows through the relatively large first turbine. However, in the operating modes under consideration here, the partial stream constitutes, in percentage terms, a not inconsiderable part of the overall exhaust-gas stream which is then not directly available to the exhaust-gas aftertreatment system for heating purposes after a cold start. The internal combustion engine according to the embodiment is equipped with an exhaust-gas recirculation arrangement comprising a line, which branches off from the exhaust-gas discharge system and which opens into the intake system, for recirculation of exhaust gas.

To adhere to future limits for nitrogen oxide emissions, use is increasingly frequently being made of exhaust-gas recirculation, that is to say the recirculation of exhaust gases from the exhaust-gas discharge system into the intake system, whereby it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR} m_{fresh\ air})$, where $m_{EGR}$ denotes the mass of recirculated exhaust gas and $m_{fresh\ air}$ denotes the supplied fresh air or combustion air which, if appropriate, is conducted through a compressor and compressed. Exhaust-gas recirculation is also suitable for reducing the emissions of unburned hydrocarbons in the part-load range.

The at least one exhaust-gas aftertreatment system may be an oxidation catalytic converter, a three-way catalytic converter, a storage catalytic converter, a selective catalytic converter and/or a particle filter.

A valve may be present at the first junction point, in a second working position, opens up the exhaust-gas discharge system toward the first turbine, and blocks the first bypass line. In one example, the valve at the first junction point may be a pivotable flap.

The internal combustion engine may be preferably supercharged either in single-stage fashion using the second exhaust-gas turbocharger in accordance with a first operating mode, or supercharged in two-stage fashion using the first exhaust-gas turbocharger and the second exhaust-gas turbocharger in accordance with a second operating mode.

In the first operating mode, the valve arranged at the first junction point is then situated in the first working position, whereas, in the second operating mode, the valve is situated in the second working position.

According to the embodiment, a charge-air cooler is arranged in the intake system between the compressors. In the context of two-stage compression, the charge-air cooler may lower the temperature of the charge air compressed in the low-pressure stage and thereby increases the density of the charge air, as a result of which the compression in the high-pressure stage is enhanced and the outlet temperature of the high-pressure stage can be lowered given an identical overall pressure ratio of the supercharging assembly. This also affords protection against thermal overloading. By means of a charge-air cooler, it is however also possible for the overall pressure ratio of the compressor group to be increased, and thus for the power to be further increased, that is to say for the power increase to be further enhanced.

The charge-air cooler may be arranged between the compressors, which makes it possible eliminate a bypass line which is imperatively provided at the high-pressure compressor. A bypass line of the type is not required according to the embodiment. Either the high-pressure compressor compresses smaller quantities of charge air in the context of single-stage compression, or relatively large quantities of charge air in the context of two-stage compression, wherein relatively large quantities of charge air are pre-compressed in the low-pressure stage and intercooled in the charge-air cooler before the charge air pre-treated in this way enters the second compressor stage, that is to say the second compressor. Bypassing of the second compressor may not be needed in either of the two operating modes. Dense packaging of the supercharging arrangement and of the drive unit as a whole is made possible.

An operating mode in which charge air is compressed in the context of single-stage compression in the low-pressure stage and is subsequently conducted past the high-pressure compressor via a bypass line is not needed, and according to the embodiment is preferably also not provided. In this respect, a switchover of the internal combustion engine or of the supercharging arrangement into the operating mode is also omitted. An undesired torque drop, such as would commonly arise in the case of such a switchover, is omitted along with the switchover process.

In this respect, the internal combustion engine according to the embodiment also has good torque characteristic, and fundamentally enhanced operating behavior. In some cases, it is possible for the internal combustion engine, in the presence of relatively high loads, to be supercharged and operated in two-stage fashion in accordance with the second operating mode over the entire engine speed range. Embodiments of the supercharged internal combustion engine are advantageous in which the valve at the first junction point is a 3-2-way valve, that is to say a valve with three ports and two switching positions.

The valve at the first junction point may be a pivotable flap. The flap, when opening up the first bypass line proceeding from a state in which the first bypass line is shut off, is pivotable counter to the exhaust-gas flow direction. Then, if the flap develops a defect, it is pivoted by the exhaust-gas stream into the position in which the first bypass line is blocked, and the exhaust gas flows through both turbines. The valve may be electrically, hydraulically, pneumatically, mechanically, or magnetically controlled, preferably by means of an engine controller.

Embodiments of the supercharged internal combustion engine are advantageous, in which the first bypass line opens into the exhaust-gas discharge system again downstream of the first turbine.

The fact that the first bypass line opens into the exhaust-gas discharge system again has the advantage that, then, all of the exhaust gas can be supplied to the at least one exhaust-gas aftertreatment system provided in the exhaust-gas discharge system.

Embodiments of the supercharged internal combustion engine are therefore also advantageous in which the first bypass line opens into the exhaust-gas discharge system again upstream of the at least one exhaust-gas aftertreatment system provided in the exhaust-gas discharge system.

Embodiments of the supercharged internal combustion engine are advantageous in which at least one further exhaust-gas aftertreatment system is provided in the first bypass line. The further exhaust-gas aftertreatment system is generally positioned closer to the outlet of the internal combustion engine than the at least one exhaust-gas aftertreatment system provided in the exhaust-gas discharge system. Therefore, the further exhaust-gas aftertreatment system reaches the required light-off temperature more quickly after a cold start.

Embodiments of the supercharged internal combustion engine are advantageous, in which the second bypass line opens into the exhaust-gas discharge system again upstream of the first junction point.

If the valve arranged at the first junction point is then situated in its first working position, in which the first bypass line is opened up and the exhaust-gas discharge system toward the first turbine is blocked, the internal combustion engine is supercharged in single-stage fashion using the second exhaust-gas turbocharger in accordance with a first operating mode, wherein all of the exhaust gas passes through the first bypass line and no exhaust gas is conducted to the first turbine.

Embodiments of the supercharged internal combustion engine may however also be advantageous, in which the second bypass line opens into the exhaust-gas discharge system again downstream of the first junction point.

By contrast to the embodiment above, it is then possible for exhaust gas to be supplied to the first turbine even when the valve arranged at the first junction point, in its first working position, blocks the exhaust-gas discharge system toward the first turbine, specifically by virtue of the second bypass line being opened up as a result of opening of the shut-off element. In this way, the first turbine can be kept at a predefinable minimum rotational speed, whereby the response behavior of the supercharging arrangement is enhanced.

Embodiments of the supercharged internal combustion engine are advantageous, in which the third bypass line branches off from the intake system upstream of the first compressor.

The bypass line may basically also serve for charge-air blow-off, whereby the charge air that is compressed in the first compressor is recirculated. A further shut-off element is provided in the third bypass line for the purpose of controlling the blown-off or recirculated charge air.

The third bypass line may however also serve for the intake of fresh air, specifically in situations in which virtually no exhaust gas or no exhaust gas flows through the first, large turbine and thus the second, smaller turbine performs the compressor work. The first compressor then merely constitutes a flow resistance for the fresh air drawn in by the second compressor. A bypass line then enables the first compressor to be bypassed, thus permitting dethrottling of the intake system. Embodiments of the supercharged internal combustion engine are advantageous in which the third bypass line opens into the intake system between the charge-air cooler and the second compressor so as to form the second junction point.

Then, in the context of the single-stage compression, the charge air is not cooled before entering the high-pressure compressor, the charge air being cooled between the compressors in the context of the two-stage compression.

Embodiments of the supercharged internal combustion engine are advantageous, in which the first compressor is larger than the second compressor. Embodiments of the supercharged internal combustion engine are advantageous, in which the first turbine is larger than the second turbine. Embodiments of the supercharged internal combustion engine are advantageous, in which the second turbine of the second exhaust-gas turbocharger has a variable turbine geometry.

A variable turbine geometry increases the flexibility of the supercharging. It permits a continuously variable adaptation of the turbine geometry to the respective operating point of the internal combustion engine and to the present exhaust-gas mass flow. By contrast to a turbine with fixed geometry, it is possible to realize more or less satisfactory supercharging over a broad engine speed and load In particular, the combination of a turbine with variable turbine geometry and a second bypass line that bypasses the turbine makes it possible for the high-pressure turbine to flow small exhaust-gas mass flows and thus for the lower part-load range. It is consequently possible to achieve high turbine pressure ratios even at low engine speeds and even in the case of very low exhaust-gas mass flows.

Embodiments of the supercharged internal combustion engine are advantageous, in which a further charge-air cooler is arranged in the intake system downstream of the compressors. The further charge-air cooler lowers the air temperature and thereby increases the density of the finally compressed air, as a result of which the further cooler contributes to charging of the combustion chamber with air, that is to say to a greater air mass.

Embodiments of the supercharged internal combustion engine are advantageous in which no bypass line which bypasses the second compressor is provided.

Embodiments of the supercharged internal combustion engine are advantageous, in which the first turbine has a fixed, invariable turbine geometry. This embodiment has, in particular, cost advantages. Firstly, with this type of turbine construction, the complex and expensive adjustment mechanism is dispensed with. Secondly, owing to the operating principle, no control of the turbine is required.

Embodiments of the supercharged internal combustion engine are advantageous, in which the first compressor has a fixed, invariable compressor geometry. Compressors with a fixed geometry have cost advantages for the same reasons as turbines with a fixed geometry, specifically owing to the simpler construction.

Embodiments of the supercharged internal combustion engine are advantageous, in which the line for exhaust-gas recirculation opens into the intake system downstream of a charge-air cooler. In this way, the exhaust-gas flow is not conducted through the charge-air cooler, and, consequently, the cooler cannot be fouled by deposits of pollutants, in particular soot particles and oil, contained in the exhaust-gas flow.

Embodiments of the supercharged internal combustion engine are advantageous, in which an additional cooler is provided in the line for exhaust-gas recirculation. Said additional cooler lowers the temperature in the hot exhaust-gas flow and thereby increases the density of the exhaust gases. The temperature of the cylinder fresh charge which results upon the mixing of the charge air with the recirculated exhaust gases is consequently further reduced in this way, as a result of which the additional cooler also contributes to charging of the combustion chamber with fresh mixture.

Embodiments of the supercharged internal combustion engine are advantageous, in which a shut-off element is provided in the line for exhaust-gas recirculation. The shut-off element serves for the control of the exhaust-gas recirculation rate.

To obtain a considerable reduction in nitrogen oxide emissions, high exhaust-gas recirculation rates are required which may be of the order of magnitude of $x_{EGR} \approx 60\%$ to 70%.

This however gives rise to a conflict during the operation of an internal combustion engine with exhaust-gas turbo-charging and along with the use of exhaust-gas recirculation if the recirculated exhaust gas is extracted from the exhaust-gas discharge system upstream of the turbine by way of high-pressure EGR and is no longer available for driving the turbine. The conflict can be easily illustrated on the basis of an internal combustion engine with single-stage supercharging by way of an exhaust-gas turbocharger.

In the event of an increase in the exhaust-gas recirculation rate, the remaining exhaust-gas flow supplied to the turbine decreases. The smaller exhaust-gas mass flow through the turbine leads to a smaller turbine pressure ratio. With decreasing turbine pressure ratio, the charge pressure ratio likewise decreases, which equates to a smaller compressor mass flow. Aside from the decreasing charge pressure, additional problems may arise in the operation of the compressor with regard to the surge limit of the compressor.

For this reason, it may be useful to provide a low-pressure EGR arrangement, if appropriate in addition to a high-pressure EGR arrangement. Embodiments of the supercharged internal combustion engine may nevertheless be advantageous, in which a high-pressure EGR arrangement is provided.

The second sub-object is achieved by way of a method wherein the internal combustion engine is supercharged either in single-stage fashion using the second exhaust-gas turbocharger in accordance with a first operating mode, or is supercharged in two-stage fashion using the first exhaust-gas turbocharger and the second exhaust-gas turbocharger in accordance with a second operating mode.

Method variants are advantageous in which, in the warm-up phase, the first bypass line is opened up, and an exhaust-gas flow to the first turbine via the second turbine is prevented, the internal combustion engine being supercharged in single-stage fashion using the second exhaust-gas turbocharger in accordance with the first operating mode.

The embodiment will be described in more detail below with reference to FIGS. 7-9.

FIG. 7 shows an embodiment of the supercharged internal combustion engine 100, based on the example of a four-cylinder in-line engine. The four cylinders 52 of the internal combustion engine 100 are arranged in a line along the longitudinal axis of the cylinder head. The exhaust lines of the cylinders 52 merge to form a common exhaust-gas discharge system 54, whereby all of the exhaust lines are connected to one another, and the same exhaust-gas pressure prevails in all exhaust lines. Furthermore, the internal combustion engine 100 has an intake system 102 for the supply of charge air to the cylinders 52.

The internal combustion engine 100 is equipped with two series-connectable turbines, a first turbine 66a and a second turbine 56a, arranged in the exhaust-gas discharge system 54 and two series-connectable compressors, a first compressor 66b and a second compressor 56b arranged in the intake system 102, wherein in each case the first turbine 66a and the first compressor 66b are combined to form a first exhaust-gas turbocharger 66 and the second turbine 56a and the second compressor 56b form a second exhaust gas turbocharger 56. The charge air supplied to the internal combustion engine 100 can thus be compressed in two stages, wherein a first exhaust-gas turbocharger 66 serves as a low-pressure stage 66 and a second exhaust-gas turbocharger 56 serves as a high-pressure stage 56. The second turbine 56*a* of the second exhaust-gas turbocharger 56 is arranged upstream of the first turbine 66*a* of the first exhaust-gas turbocharger 66, and the second compressor 56*b* of the second exhaust-gas turbocharger 56 is arranged downstream of the first compressor 66*b* of the first exhaust-gas turbocharger 66.

The first compressor 66*b* is larger than the second compressor 56*b*, because the first compressor 66*b* forms the low-pressure stage within the context of a two-stage compression, whereas the second compressor 56*b* compresses the already pre-compressed air and thus constitutes the high-pressure stage.

For the same reason, the first turbine 66*a* is larger than the second turbine 56*a*. This is because the second turbine 56*a* serves as a high-pressure turbine 56*a*, whereas the first turbine 66*a* serves for expanding an exhaust-gas stream which is already at a relatively low pressure and has a relatively low density owing to the fact that it has already passed through the high-pressure stage.

A charge-air cooler 64*a* is arranged in the intake system 102 between the first compressor 66*b* and the second compressor 56*b*. A further charge-air cooler 64*b* is provided downstream of the first compressor 66*b*, and the second compressor 56*b*. The air temperature is lowered and thus the density of the charge air is increased, whereby efficient charging of the cylinders 52 with air is achieved.

An exhaust-gas aftertreatment system 62 is provided in the exhaust-gas discharge system 54 downstream of the first turbine 66*a*, and the second turbine 56*a*.

In the embodiment illustrated in FIG. 7, the first turbine 66*a* has a fixed, invariable turbine geometry and a first bypass line 60 branches off from an exhaust-gas line 55 between the first turbine 66*a* and the second turbine 56*a* so as to form a first junction point 57*a*. The first bypass line 60 opens into a common exhaust line downstream of the first turbine 66*a* and upstream of the exhaust-gas aftertreatment system 62 provided in the exhaust-gas discharge system 54. A valve 58, in the present case a 2-way valve 58, is arranged at the first junction point 57*a*.

The second turbine 56*a* of the second exhaust-gas turbocharger 56 has a variable turbine geometry and a second bypass line 72, which branches off from the exhaust-gas discharge system 54 upstream of the second turbine 56*a* and which opens into the exhaust-gas discharge system 54 again downstream of the first junction point 57*a*, between the first turbine 66*a* and the second turbine 56*a*. A shut-off element 73 is arranged in the second bypass line 72.

The first compressor 66*b* is equipped with a third bypass line 68 which branches off from the intake system 102 upstream of the first compressor 66*b* and which opens into the intake system 102 between the first compressor 66*b* and the second compressor 56*b* so as to form a second junction point 57*b*. The third bypass line 68 has a further shut-off element 70 and opens into the intake system 102 between the charge-air cooler 64*a* and the second compressor 56*b*. The internal combustion engine 100 is equipped with an exhaust-gas recirculation arrangement (not illustrated).

The engine system of FIG. 7 may further include a control system 213, similar to the control system 112 of FIG. 1. The control system may include a controller 213. The controller 213 is shown in FIG. 4 as a microcomputer, including microprocessor unit 203, input/output ports 205, an electronic storage medium for executable programs and calibration values shown as read only memory chip 207 in this particular example, random access memory 209, keep alive memory 211, and a data bus. Controller 213 may receive various signals from sensors coupled to engine 100, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 213 from signal PIP. One or more temperature sensors (not shown) may be positioned in the exhaust to measure exhaust gas temperature, exhaust-gas aftertreatment system temperature, or other temperatures.

Storage medium read-only memory 207 can be programmed with computer readable data representing instructions executable by processor 203 for performing the methods described below as well as other variants that are anticipated but not specifically listed. Example methods are described with reference to FIG. 9.

The controller 213 receives signals from the various sensors of FIG. 7 and employs the various actuators of FIG. 7 to adjust engine operation based on the received signals and instructions stored on a memory of the controller. For example, the controller may receive feedback from one or more sensors to determine engine load, engine speed, and/or aftertreatment device temperature (such as feedback from MAF, MAP, PIP sensors, and temperature sensors) and may then adjust an actuator coupled to the valve 57*a* and the shut-off element 73, illustrated in FIG. 7.

FIG. 8 schematically shows the engine characteristic map of the embodiment as per FIG. 7. The internal combustion engine 100 is supercharged either in single-stage fashion using the second exhaust-gas turbocharger 56 in accordance with a first operating mode F, or supercharged in two-stage fashion using the first exhaust-gas turbocharger 66 and the second exhaust-gas turbocharger 56, in accordance with a second operating mode G.

During the operation of the internal combustion engine 100, the turbochargers are engaged in a manner dependent on a torque of the internal combustion engine 100. When the torque is below a threshold torque $T_{t1}$, the engine is in the first operating mode F, where exhaust from the cylinders 52 to the first turbine 66*a* of the first turbocharger 66 and engages the first compressor 66*b* that compresses intake air and directs it to flow to the engine. As the torque demand is less than the threshold torque $T_{t1}$, the low pressure stage is engaged in delivering compressed intake air to meet the boost pressure demands.

When the torque is above the threshold torque $T_{t1}$, the engine operates in the second operating mode G, as illustrated in FIG. 8. Exhaust flows from the cylinders to the second turbine 56*a* of the second exhaust gas turbocharger 56 and then through the valve 57*a* to the first turbine 66*a*, thereby engaging both the high pressure turbocharger and the low pressure turbocharger. Exhaust flows downstream of the first turbine to the exhaust-gas aftertreatment system 62. The first compressor 66*b* and the second compressor 56*b* are both engaged and directs compressed intake air into the internal combustion engine 100 through the charge air cooler 64*b*.

FIG. 9 illustrates a method 900 for operating the four cylinder engine coupled to two turbochargers. In one example, the method 900 may be used to operate the system illustrated in FIG. 7, including the cylinders 52 of the internal combustion engine 100. The engine 100 includes the large turbocharger 66, and the small turbocharger 56. The first turbine 66a and the second turbine 56a may be arranged in parallel or in series along the exhaust-gas discharge system 54 and the first compressor 66b and the second compressor 56b may be arranged in series along the intake system 102, as illustrated in FIG. 7. Method 900 may be carried out according to instructions stored in memory of a controller, such as controller 213 of FIG. 7, in combination with one or more sensors of the engine and/or actuators of the engine (e.g., the valves described above).

The method 900 begins at 902 by assessing engine operating parameters, including but not limited to, engine speed, engine torque, engine temperature, etc. The method 900 then proceeds to 904 to assess if the engine torque is above a threshold torque, such as greater than 75% maximum rated torque and/or during acceleration, uphill driving etc. If the engine torque is above the threshold torque, the method 900 proceeds to 906 to operate the engine in a second operating mode, where both the high-pressure turbocharger and the low-pressure turbocharger are engaged. To operate the engine in the second operating mode, the compressor shut-off element is closed (e.g., shut-off element 70), the second turbine shut-off element (e.g., shut-off element 73) is adjusted based on operating conditions to meet boost and prevent surge/overspeed, and the turbine switching valve (e.g., valve 58) is in a first position where exhaust exiting the second turbine flows to the first turbine. At 908, exhaust flows from the engine cylinders to the second turbine of the second turbocharger (e.g., the high-pressure turbocharger). The exhaust from the second turbine flows to the first turbine and then from the first turbine to the downstream aftertreatment device (for example, the aftertreatment device 62 of FIG. 7). At 910, both the first compressor of the first turbocharger and the second compressor of the second turbocharger are driven by the first turbine and the second turbine, respectively, resulting in two stage compression of intake air by the compressors, providing the required boost pressure to the engine to meet the torque demand. The method 900 then returns.

At 904, if the engine torque is below the threshold torque, the method 900 proceeds to 912, and operates the engine in the first operating mode, where the high pressure turbocharger is engaged (for example, the second turbocharger 56). To operate the engine in the first operating mode, the compressor shut-off element is open (e.g., shut-off element 70), the second turbine shut-off element (e.g., shut-off element 73) is closed, and the turbine switching valve (e.g., valve 58) is in a second position where exhaust exiting the second turbine flows to the aftertreatment device and then atmosphere, without flowing through the first turbine. At 914, exhaust flows to the second turbine of the second turbocharger from the engine, and then flows to an aftertreatment device downstream. At 916, the second compressor is driven by the second turbocharger, resulting in one stage high pressure compression of intake air by the second compressor, delivering the intake air to the engine. The method 900 then returns.

Thus, operating the engine by one stage compression of intake air or two stage compression of the intake air along a wide engine load range may increase engine efficiency. Additionally, flowing exhaust through only one turbine before flowing the exhaust to an aftertreatment device, may enable the aftertreatment device to reach light-off temperature faster, especially during cold start conditions. In this way, by regulating exhaust and intake air flow paths in an engine with two turbochargers arranged in series may generate the desired torque during various engine operating conditions.

To achieve the above benefits, the system includes a high pressure variable nozzle turbocharger (HP-VNT, the second turbocharger described above). This turbocharger covers the whole emission and real world driving range in single turbo mode. It is also continuously used in the whole engine map up to peak power. The system also includes a low-pressure (LP)-Wastegate turbo (the first turbocharger described above). This turbocharger works in series with the HP-VNT turbo at, or closed to, full load. In some examples, the system includes two intercoolers. One intercooler is located just downstream of each compressor outlet. In series mode this set-up enables interstage cooling. The system also includes a compressor bypass valve (CBV, also referred to as the compressor shut-off valve). This valve is open in the mono-turbo mode and bypasses the LP-compressor and IC. The system further includes a turbine bypass valve (TBV, also referred to as the second turbine shut-off valve). This valve is closed in the mono-turbo mode and controls exhaust flow split in series operation. The system also includes a turbine switching valve (2-way; On/Off type). This valve is open to exhaust and closed to the LP turbine in mono turbo mode. In series operation it is closed to the exhaust and open to the LP-turbine.

In the mono-turbo mode only the VNT-HP-turbo is used. This operation ensures lowest exhaust temperature losses due to the low thermal inertia of just one turbine. Also mid-speed fuel consumption is optimal as the VNT turbocharger is matched to operate without causing excessive backpressure also in this operating range. At higher loads and full load the boosting system operates always in series mode with strong interstage cooling. This will enable very high power output because two compressors (high pressure ratio) are used also at peak power. Also no torque dip may occur during a full load acceleration because no mode switching is needed versus engine speed.

FIG. 10 shows another embodiment of an internal combustion engine, with two turbochargers arranged in series, with an exhaust gas aftertreatment device between the turbines, and a fluidic connection between exhaust tract and intake tract for exhaust gas recirculation, as will be discussed in detail below.

Turbochargers serve for supercharging the cylinders of internal combustion engines with combustion air under positive pressure. A turbocharger includes a turbine and a compressor, which may be constructed in a similar manner and mounted on a common shaft. The mass flow of the exhaust gas sets the turbine wheel in the exhaust tract into rotation. The torque is transmitted via the common shaft to the compressor wheel in the intake tract, as a result of which the compressor compresses combustion air. In the case of serially arranged turbochargers for supercharging internal combustion engines, exhaust gas first of all flows through the turbine of a first turbocharger and subsequently through the turbine of a second turbocharger arranged downstream of the turbine of the first turbocharger. The turbine of the second turbocharger may also be able to be switched on when required or if there is sufficient exhaust gas for the operation thereof.

An advantage of serially arranged turbochargers is the high efficiency with which corresponding internal combustion engines operate. A disadvantage resides in significant heat losses since a large amount of heat energy is extracted from the exhaust gas as the latter flows through the turbines. As a result, less heat energy is available to an exhaust gas aftertreatment device arranged downstream of the turbines.

This leads to a delayed starting of the exhaust gas aftertreatment device and therefore to greater emission of exhaust gas pollutants.

A reduction particularly in emission of nitrogen oxides in the exhaust gas can be achieved by exhaust gas recirculation. For this purpose, exhaust gas may be mixed with the charge air and recirculated through an internal combustion engine. In motor vehicles having a diesel engine and low-pressure exhaust gas recirculation arrangement (LP-EGR), the exhaust gas or part of the exhaust gas is conducted away in the direction of a compressor via a recirculation valve arranged downstream of a diesel particle filter (DPF) in the flow direction of the exhaust gas. As a rule, because of the low temperatures of the exhaust gas after passing through two turbines, particularly in the case of low loads of the internal combustion engine, an additional high-pressure exhaust gas recirculation arrangement (HP-EGR) may be required in order to avoid too low charge air inlet temperatures since the latter may lead to excessive carbon monoxide and hydrocarbon emissions. However, a disadvantage of an HP-EGR is that the exhaust gas which is conducted in causes higher temperatures than desired and that, by conducting away exhaust gas, the exhaust gas mass flow is reduced before reaching the turbine of a turbocharger.

An example system and method for operating an internal combustion engine, may include an exhaust tract, an intake tract, a first turbocharger and a second turbocharger, wherein the second turbocharger is arranged serially with respect to the first turbocharger such that the turbine of the first turbocharger and the turbine of the second turbocharger are fluidically connected via at least one exhaust line of the exhaust tract, and wherein at least one first exhaust gas aftertreatment device is arranged in the exhaust line downstream of the turbine of the first turbocharger, and at least one line of an exhaust gas recirculation arrangement, via which a fluidic connection to an intake line of the intake tract can be produced, branches off from the exhaust line downstream of the first exhaust gas aftertreatment device.

In addition to the serially arranged turbochargers, an intermediate exhaust gas aftertreatment device downstream of the turbine of the first turbocharger and an LP-EGR branching off downstream of the turbine may be present. This may allow rapid starting of the exhaust gas aftertreatment device since exhaust gas heat has been extracted from the exhaust gas at this point in a turbine. Furthermore, the exhaust gas conducted away downstream of the high-pressure turbine still may have sufficient heat energy, and therefore exhaust gas does not have to be conducted away via an HP-EGR.

The first turbocharger may be referred to as a high-pressure turbocharger, and the turbine and compressor thereof as a high-pressure turbine and a high-pressure compressor, respectively. The second turbocharger may also be referred to as a low-pressure turbocharger, and the turbine and compressor thereof as a low-pressure turbine and low-pressure compressor, respectively. The first exhaust gas aftertreatment device may be referred to as an intermediate exhaust gas aftertreatment device.

The internal combustion engine is particularly a compression-ignition internal combustion engine, but may also be a different internal combustion engine. The high-pressure turbine may be a turbine with variable turbine geometry (variable nozzle turbine, VNT turbine), but may also be different.

The line of the exhaust gas recirculation arrangement may be preferably connected to the intake line by means of a combination valve. As a result, the exhaust gas recirculation arrangement may be regulated or switched on or off.

The line of the exhaust gas recirculation arrangement may be connected to the intake line downstream of the compressor of the second turbocharger. By mixing the exhaust gas conducted in with already heated, compressed air from the low-pressure compressor, condensation of water which may be contained in the recirculated exhaust gas and which may damage the subsequent compressor is advantageously restricted.

A first charge air cooler may be additionally arranged in the intake line downstream of the mouth of the line of the exhaust gas recirculation arrangement. By means of the exhaust gas recirculation arrangement opening upstream into the intake tract, the first charge air cooler may be a cooler for the charge air and for the introduced, recirculated exhaust gas. A special charge air cooler for the exhaust gas is therefore not required.

Upstream of the first charge air cooler, a first bypass line with a cooler bypass valve may branch off from the intake line and, downstream of the first charge air cooler, and may open again into the intake line. In the event of a low load of the internal combustion engine, when the cooler bypass valve is open, exhaust gas may be conducted past the first charge air cooler, as a result of which a higher inlet temperature of charge air into the cylinders of the internal combustion engine may be achieved. As a result, the emission of carbon monoxide and unburned hydrocarbons may be kept low.

Furthermore, downstream of the first charge air cooler and upstream of the high-pressure compressor, a second bypass line with a compressor bypass valve may branch off from the intake line and, downstream of the compressor of the first turbocharger, and open again into the intake line. A third bypass line with a condensate outlet valve may fluidically connect the first charge air cooler and the inlet manifold of the internal combustion engine. The condensate outlet valve may permit, for example, condensate to be conducted away from the first charge air cooler.

A fourth bypass line with a turbine bypass valve may be arranged in the exhaust tract, the fourth bypass line branching off from the exhaust line downstream of the internal combustion engine and opening into the exhaust line upstream of the turbine of the second turbocharger. The fourth bypass line may allow exhaust gas to be conducted past the high-pressure turbine such that the exhaust gas may be introduced into the exhaust line upstream of the low-pressure turbine and can be used for driving the low-pressure turbine. A second exhaust gas aftertreatment device may be present in the exhaust line downstream of the low-pressure turbine, the second exhaust gas aftertreatment device permitting the aftertreatment both of non-recirculated exhaust gas and exhaust gas conducted in via the fourth bypass line.

FIG. 10 shows an embodiment 250 of an internal combustion engine 252 with four cylinders 252a in a series arrangement. The cylinders may also be arranged differently, for example in a V-shaped arrangement. Exhaust gas flows from the outlet openings of the cylinders 252b into an exhaust tract 253. The exhaust tract 253 may have an exhaust line 253a, but may also comprise a plurality of exhaust lines. Charge air flows to the internal combustion engine 252 via an intake tract 254. The intake tract 254 may have an intake line 254a, but may also comprise a plurality of intake lines. A turbine 255a, also referred to as a high-pressure turbine 255a, which belongs to a first turbocharger 255 and is connected to a compressor 255c via a shaft 255b may be arranged in the exhaust tract 253. The turbine 255*a* may be fluidically connected via the exhaust tract to a turbine 256*a*, also referred to as a low-pressure turbine, which belongs to a second turbocharger 256. The turbine 256*a* may be connected to a compressor 256*c* via a shaft 256*b*. A first exhaust gas aftertreatment device 257 may be arranged between the turbines 255*a*, 256*a* downstream of the high-pressure turbine 255*a*. The exhaust gas aftertreatment device 257 may include, for example, a NOx storage catalytic converter, a diesel oxidation catalytic converter and/or a diesel particle filter.

A line 258 which represents the beginning of a LP-EGR passage branches off from an exhaust gas recirculation valve 258*a* downstream of the first exhaust gas aftertreatment device 257. The line 258 opens into the line 254*a* of the intake tract 254 via a combination valve 259.

A first charge air cooler 260 may be arranged in the intake tract 254 downstream of the combination valve 259. The first charge air cooler 260 is provided both for cooling compressed charge air from the compressor 256*c* of the second turbocharger 256 and exhaust gas conducted in. Via a first bypass line 261, charge air, particularly charge air mixed with exhaust gas, may be conducted around the first charge air cooler 260 by the cooler bypass valve 262 being opened. The first bypass line 261 branches off from the intake line 254*a* at a point 261*a* and opens again into the intake line 254*a* at the point 261*b*.

The compressor 255*c*, also referred to as the high-pressure compressor 255*c*, is arranged downstream of the charge air cooler 260. Charge air can be conducted around the high-pressure compressor 255*c* via a second bypass line 263 when a compressor bypass valve 264 arranged in the second bypass line 263 is opened. The second bypass line 263 branches off from the intake line 254*a* at a point 263*a* and opens again into the intake line 254*a* at the point 263*b*.

A second charge air cooler 265 may be arranged in the intake tract downstream of the high-pressure compressor 255*c*. The intake line 254*b* leads from the second charge air cooler 265 to the intake manifold 266. A third bypass line 267 leads from the first charge air cooler 260 to the intake manifold 266. When a condensate outlet valve 268 is open, condensed water may be conducted out of the first charge air cooler 260 via the third bypass line 267 directly to the intake manifold 266.

A fourth bypass line 269 with a turbine bypass valve 270 is arranged in the exhaust tract 253 downstream of the internal combustion engine 252. The fourth bypass line 269 branches off from the exhaust line 253*a* in the region of the exhaust gas manifold 271 at the point 269*a* and opens again into the exhaust line 253*a* upstream of the low-pressure turbine 256*a* at the point 269*b*.

A second exhaust gas aftertreatment device 272 may be arranged downstream of the low-pressure turbine 256*a*. The second exhaust gas aftertreatment device 272 may include, for example, a NOx storage catalytic converter, a diesel oxidation catalytic converter and/or a diesel particle filter. Downstream of the turbine 256*a*, the exhaust gas may be conducted away by an exhaust 273.

During operation of the internal combustion engine 252, exhaust gas flows from the cylinders 252*a* through the exhaust tract 253 in the direction of the exhaust 273. Exhaust gas passes here from the internal combustion engine 252 to the high-pressure turbine 255*a* in order to drive the latter. The turbine 255*a* drives the compressor 255*c* by means of the shaft 255*b*. Exhaust gas flows from the high-pressure turbine 255*a* to the first exhaust gas aftertreatment device 257. From there, the after treated and cleaned exhaust gas flows on to the exhaust gas recirculation valve 258*a*. The exhaust gas recirculation valve 258*a* is designed here to be at least partially opened. Via an open exhaust gas recirculation valve 258*a*, a certain part of the exhaust gas, depending on the degree of the opening, may be conducted into the intake line 254*a* via the line 258. When the combination valve 259 is at least partially open, the exhaust gas passes into the intake line 254*a* and may be mixed with the intake air flowing from the low-pressure compressor 256*c*. The valves 258*a* and 259 may be opened and closed by a signal of a controller when exhaust gas is intended to be recirculated.

The charge air mixed with the exhaust gas conducted in passes downstream of the combination valve 259 into the first charge air cooler 260. From there, the cooled gas mixture may be conducted to the high-pressure compressor 255*c*. At very low loads of the internal combustion engine 252, the cooler bypass valve 262 is opened. As a result, the gas mixture flows past the first charge air cooler 260 and therefore obtains its temperature. A higher inlet temperature of the gas mixture at the cylinders 252*a* is therefore especially targeted in order to control the emission of carbon monoxide and unburned hydrocarbons. However, at a higher load, the operation of the internal combustion engine 252 is more efficient if the gas mixture is cooled in the first charge air cooler 260.

Via the second bypass line 263, charge air or the gas mixture is conducted past the high-pressure compressor 255*c* if the latter, for example, is not required. Via the third bypass line 267, condensate from the first charge air cooler 260 is conducted into the intake manifold 266 if condensate has formed.

At a high load of the internal combustion engine 252, part of the exhaust gas is conducted past the high-pressure turbine 255*a* via a fourth bypass line 269 in order to avoid exhaust gas backing up. For this purpose, a part of the exhaust gas is conducted away in the region of the exhaust gas manifold 271 from the exhaust line 253*a* at a branch 269*a*. A valve is ideally arranged for this purpose on the branch 269*a*, the valve being opened in order to conduct exhaust gas through the fourth bypass line 269.

The engine system may further include a control system. The control system may include a controller 283, shown in FIG. 10 as a microcomputer, including microprocessor unit 288, input/output ports 285, an electronic storage medium for executable programs and calibration values shown as read only memory chip 288 in this particular example, random access memory 289, keep alive memory 290, and a data bus. Controller 283 may receive various signals from sensors coupled to engine, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 283 from signal PIP. One or more temperature sensors (not shown) may be positioned in the exhaust to measure exhaust gas temperature, exhaust-gas aftertreatment system temperature, or other temperatures.

Storage medium read-only memory 287 can be programmed with computer readable data representing instructions executable by processor 288 for performing the methods described below as well as other variants that are anticipated but not specifically listed. Example methods are described with reference to FIG. 11.

The controller 283 receives signals from the various sensors of FIG. 10 and employs the various actuators of FIG. 10 to adjust engine operation based on the received signals and instructions stored on a memory of the controller. For example, the controller may receive feedback from one or more sensors to determine engine load, engine speed, and/or aftertreatment device temperature (such as feedback from MAF, MAP, PIP sensors, and temperature sensors) and may then adjust an actuator coupled to the first turbine bypass valve 270 to regulate exhaust flow to the first turbine.

FIG. 11 illustrates a method 950 for operating an internal combustion, for example the internal combustion engine 252 with the high pressure turbocharger 255 and the low pressure turbocharger 256, as illustrated in FIG. 10. In one example, the method 950 may regulate exhaust flow path and intake air flow path in the internal combustion engine by regulating positions of the turbine bypass valve 270, the exhaust gas recirculation valve 258a, the compressor bypass valve 263a and the cooler bypass valve 262. The controller 283 may regulate actuators of the abovementioned valves, responsive to engine operating conditions, for example, in response to engine load above or below a threshold. Method 950 may be carried out according to instructions stored in memory of a controller, such as controller 283 of FIG. 10, in combination with one or more sensors and/or actuators of the engine.

The method 950 begins at 952 by assessing engine operating parameters, including but not limited to, engine speed, engine torque, engine temperature, etc. The method 950 then proceeds to 954 to assess if the engine load is above a first threshold load, such as during acceleration, uphill driving etc. If the engine load is below the first threshold, the method proceeds to 956, where the high pressure turbine is engaged and the turbine bypass valve is closed. Exhaust flows from the engine to the high pressure turbine along the exhaust tract.

However, at 954, if the engine load is above the threshold, some of the exhaust may be diverted away from the high pressure turbine through an open/partially open turbine bypass valve at 955, directing part of the exhaust to bypass the high pressure turbine and flow to the low pressure turbine. Diverting the some of the exhaust away from the high pressure turbine may reduce the load on the turbine.

At 958, exhaust from the fully engaged high pressure turbine at 956, or from the partially engaged high pressure turbine at 955, flows through the first aftertreatment device (for example, the first aftertreatment device 257 downstream of the turbine 255a, illustrated in FIG. 10).

The method 950 proceeds to 960, where the EGR valve is at least partially open, directing at least a part of exhaust to flow from the first charge air cooler to the intake line, downstream of the low pressure compressor, upstream of the second charge air cooler (for example, exhaust may flow through the exhaust gas recirculation valve 258a, through the line for exhaust gas recirculation 258 to the intake tract 254, as illustrated in FIG. 10).

At 962, the method 950 determines if the engine load is more than a second threshold. If engine load is not more than the second threshold, the method proceeds to 964. In one example, the second threshold may be less than the first threshold. At 964, the first charge air cooler bypass valve may be open, such that intake air bypasses the first charge air cooler and flows through the high pressure compressor and through the second charge air cooler to the engine at 966.

If at 962, the engine load is above the second threshold, the method 950 proceeds to 968, where the first charge air cooler bypass valve is closed and intake air flows through the first charge air cooler. At 970, the method determines if the engine load is above a third threshold. The third threshold may be higher than the first threshold and higher than the second threshold. In another example, the third threshold may be equal to the first threshold and higher than the second threshold. If the engine load is above the third threshold, the method proceeds to 976, where the compressor bypass valve is open, at least partially, diverting some of the intake air from the high pressure compressor to reduce the load on the high pressure compressor. At 978, intake air flows at least partially bypassing the high pressure compressor and through the second charge air cooler to the engine. The method 950 then returns.

If the engine load at 970 is below the third threshold, the method 950 proceeds to 972, where the high pressure compressor bypass valve is closed. At 974, intake air flows through the high pressure compressor to the second charge air cooler and then to the engine. The method 950 then returns.

In this way, depending on engine load, exhaust and intake air flow paths may be regulated to meet the engine load demands in conjunction with efficient aftertreatment of exhaust and adequate cooling and charging of the intake air before it is delivered to the engine.

In the system described above, exhaust gas enters the aftertreatment system just downstream of the high pressure turbine. Only the HP turbine causes an exhaust temperature drop before the exhaust gas flows through the aftertreatment. This causes higher exhaust gas temperatures at the interstage aftertreatment and enables fast light-off. Interstage EGR temperature is also higher compared to a standard LP-EGR system. At very low loads the increased EGR temperature (with the interstage cooler bypass open) enables also higher intake temperatures, which may control CO/HC emissions. This can eliminate the need for an additional high pressure EGR system. Because interstage EGR flow enters the fresh air system downstream of the LP-compressor, also the risk of condensate after mixing is reduced because the fresh air is pre-heated and compressed by the LP-compressor. The interstage cooler is used as an air plus EGR cooler during all operating conditions with EGR, thus eliminating the need for a dedicated EGR cooler. At full load in series operation the interstage cooler is also a very effective measure to increase engine output. At high speed/high load engine operation some exhaust has to be bypassed around the HP turbo. For these operating conditions, also a dedicated high load aftertreatment is installed. However, this system can be specifically sized and optimized for high load operation at high exhaust temperatures.

In FIG. 12, an embodiment 350, and in FIG. 13, an embodiment 450 of a motor vehicle are illustrated. The motor vehicle may include an internal combustion engine 351. An inlet air line 352 may carry inlet air 372 to the internal combustion engine 351 for the operation thereof. To discharge an exhaust gas 373 formed in the operation of the internal combustion engine 351, an exhaust tract 353 may be present. An exhaust gas recirculation line 356 may pass exhaust gas 373 into the inlet air line 352 from the exhaust tract 353. The exhaust gas recirculation line 356 may be for low-pressure exhaust gas recirculation and, for this purpose, may be connected fluidically to the exhaust tract 353 downstream of an exhaust gas aftertreatment device 366 arranged in the exhaust tract 353. The exhaust gas aftertreatment device may be a nitrogen oxide trap, a particulate filter, or an oxidation catalyst.

A first compressor 359 may be present in the inlet air line 352. The first compressor 359 may be part of a first turbocharger 357, which may include a first exhaust turbine 358 arranged in the exhaust tract 353 and a first turbocharger shaft 360, via which the first compressor 359 and the first exhaust turbine 358 may be connected in a torque-transmitting manner. Consequently, the first turbocharger 357 may be an exhaust turbocharger. In particular, the first exhaust turbine 358 may have a variable turbine geometry with a variable nozzle, wherein guide vanes of the first exhaust turbine 358 may be adjustable.

A second compressor 363 may be present in the exhaust gas recirculation line 356. The second compressor 363 may be part of a second turbocharger 361. The second turbocharger 361 may be an exhaust turbocharger or may be a motor-operated turbocharger.

In FIG. 12, the second turbocharger 361 is shown as an exhaust turbocharger. As an exhaust turbocharger, the second turbocharger 361 has a second exhaust turbine 362, which is arranged in the exhaust tract 353. A second turbocharger shaft 364 connects the second exhaust turbine 362 and the second compressor 363 to one another in a torque-transmitting manner. In this embodiment, the exhaust tract 353 preferably comprises two exhaust lines 354, 355, which may be arranged so as to act in parallel, at least in some section or sections, and which may have the same direction of flow. The first exhaust turbine 358 is arranged in a first exhaust line 354, and the second exhaust turbine 362 is arranged in a second exhaust line 355. The mass flow through the second exhaust turbine 362 and hence, the speed of the second compressor 363 may be adjusted by means of an exhaust gas valve 377, which may be present in the second exhaust line 355 upstream of the second exhaust turbine 362, for example.

The second turbocharger 361 may be a motor-operated turbocharger, as illustrated in FIG. 13. As a motor-operated turbocharger, the second turbocharger 361 has a motor 380 instead of the second exhaust turbine 362, the motor 380 being connected to the second compressor 363 in a torque-transmitting manner by means of the second turbocharger shaft 364. The motor 380 may be an electric motor. The speed of the second compressor 363 may be adjusted by changing the speed of the motor 380.

To cool the compressed inlet air 372, a charge air cooler 367 may be arranged in the inlet air line 352 downstream of the first compressor 359. To cool the recirculated exhaust gas 373, an exhaust gas cooler 368 may be arranged in the exhaust gas recirculation line 356 upstream of the second compressor 363. Arranged around the exhaust gas cooler 368 may be an exhaust gas cooler bypass 378, which may carry the recirculated exhaust gas 373 around the exhaust gas cooler 368 and may exempt it from cooling. To control the mass flow of the recirculated exhaust gas 373 through the exhaust gas cooler 368 or through the exhaust gas cooler bypass 278, an exhaust gas cooler bypass valve 379 may be present. The exhaust gas cooler bypass valve 379 may be a combination valve.

The recirculated exhaust gas 373 may be introduced into the inlet air line 352. A first inlet valve 374, by means of which the recirculated exhaust gas 373 may be brought into the inlet air line 352 at a first inlet point 369. The first inlet point 369 is positioned upstream of the first compressor 359. The first inlet valve 374 may be arranged upstream of the second compressor 363 in the exhaust gas recirculation line 356. The first inlet valve 374 may be a combination valve. At least some of the recirculated exhaust gas 373 into the inlet air line 352 as low-pressure exhaust gas.

A second inlet valve 375, by means of which the recirculated exhaust gas 373 may be introduced into the inlet air line 352 at a second inlet point 370. The second inlet point 370 may be positioned downstream of the first compressor 359 and upstream of the charge air cooler 367. The second inlet valve 375 may be arranged downstream of the second compressor 363 in the exhaust gas recirculation line 356. A required mass of recirculated exhaust gas 373 with a predefined pressure may be produced by the second compressor 363 into the inlet air line 352 upstream of the charge air cooler 367 and downstream of the first compressor 359 at a medium load of the internal combustion engine 351. Unwanted condensation upstream of the first compressor 359 may be avoided and the recirculated exhaust gas 373 introduced into the inlet air line 352 together with the inlet air 372 may be cooled in the charge air cooler 367. The recirculated exhaust gas 373 which is as cool as possible at a high load of the internal combustion engine 351 as a result of pre-cooling the recirculated exhaust gas 373 in the exhaust gas cooler 368 and introducing it into the inlet air line 352 upstream of the charge air cooler 367 and cooling it in the charge air cooler 367 together with the inlet air 372.

A third inlet valve 376 may be present by means of which the recirculated exhaust gas 373 may be introduced into the inlet air line 352 at a third inlet point 371. The third inlet point 371 may be positioned downstream of the charge air cooler 367. The third inlet valve 376 may be arranged in the exhaust gas recirculation line 356 downstream of the second compressor 363 and downstream of the second inlet valve 375. Thus, a required mass of recirculated exhaust gas 373 with a predefined pressure produced by the second compressor 363 into the inlet air line 352 downstream of the charge air cooler 367 at a low load of the internal combustion engine 351. At the same time, the recirculated exhaust gas 373 may be passed through the exhaust gas cooler bypass 378. This ensures a high temperature of the recirculated exhaust gas 373. Moreover, no throttling of the mass flow of the recirculated exhaust gas 373 may be needed since it can be adjusted by means of the second compressor 363.

The engine system may further include a control system. The control system may include a controller 383, shown in FIGS. 12 and 13 as a microcomputer, including microprocessor unit 388, input/output ports 385, an electronic storage medium for executable programs and calibration values shown as read only memory chip 388 in this particular example, random access memory 389, keep alive memory 390, and a data bus. Controller 383 may receive various signals from sensors coupled to engine, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 383 from signal PIP. One or more temperature sensors (not shown) may be positioned in the exhaust to measure exhaust gas temperature, exhaust-gas aftertreatment system temperature, or other temperatures.

Storage medium read-only memory 387 can be programmed with computer readable data representing instructions executable by processor 388 for performing the methods described below as well as other variants that are anticipated but not specifically listed. Example methods are described with reference to FIG. 14.

The controller 383 receives signals from the various sensors of FIGS. 12 and 13 and employs the various actuators to adjust engine operation based on the received signals and instructions stored on a memory of the controller. For example, the controller may receive feedback from one or more sensors to determine engine load, engine speed, and/or aftertreatment device temperature (such as feedback from MAF, MAP, PIP sensors, and temperature sensors) and may then adjust an actuator coupled to the first inlet valve, the second inlet valve and the third inlet valve to regulate exhaust flow.

FIG. 14 illustrates a method 980 for operating the four cylinder engine coupled to two turbochargers. In one example, the method 980 may be used to operate the systems illustrated in FIGS. 12 and 13, including the internal combustion engine 351. The engine 351 includes the first turbocharger 357, and the second turbocharger 361, arranged in series. The inlet line 352 may carry intake air to the engine. The first inlet valve 374, the second inlet valve 375, and the third inlet valve 376 may be present along the inlet line as illustrated in FIGS. 12-13. The position of the valves in the systems illustrated in FIGS. 12 and 13 may be regulated by the controller 383. Method 980 may be carried out according to instructions stored in memory of a controller, such as controller 383 of FIG. 13 in combination with one or more sensors and/or actuators of the engine.

The method 980 begins at 982 by assessing engine operating parameters, including but not limited to, engine speed, engine torque, engine temperature, etc. The method 980 then proceeds to 984 to assess if the engine torque is below a first threshold torque, such as during downhill driving. At 984, if the torque is below the first threshold, the method 980 proceeds to 990, where the first inlet valve is open, flowing intake air to the inlet line (bypassing the second compressor). The intake air flows through the first compressor, through the charge air cooler to the engine. This ensures high EGR temperatures and avoids throttling, because the second compressor is used to pump the required EGR mass flow. The method 980 then returns.

At 984, if the engine torque is above the first threshold, the method 980 proceeds to 986 and to determine if the engine torque is above the second threshold. In one example, the second threshold may be higher than the first threshold. If yes, the method proceeds to 988, where the third inlet valve is open. Intake air flows through the second compressor and flows throw the third inlet valve to the engine, bypassing the charge air cooler. In this operating condition relatively high EGR mass flow is required with high levels of EGR cooling. Normally, the LP-EGR system (LP-EGR cooler, LP-EGR injector, Combi-valve, upstream of charge air compressor) would be sufficient for this task. However, at low ambient temperatures and high EGR rates a high risk of condensate occurs just upstream of the charge air compressor where the fresh, cold air mixes with the warm and humid EGR flow. In these cases, the EGR compressor may pump EGR to the HP-EGR injector just downstream of the charge air compressor and upstream of the charge air cooler. This will avoid any condensate upstream of the charge air compressor and ensures required low EGR temperatures as the total air and EGR mass is cooled within the charge air cooler. The method 980 then returns.

If at 986, the engine torque is not above the second threshold, the method 980 proceeds to 992 where the torque is between the first threshold and the second threshold, for example, driving on a flat road. The method 980 proceeds to 994, where the second inlet is open and the intake air is delivered through the second compressor to the charge air cooler and then from the charge air cooler to the engine. In this operating condition very cold EGR is required. A conventional LP-EGR system would be limited because the charge air compressor operates very close to the choke threshold and the compressor outlet temperature threshold will be easily exceeded. In the system illustrated in FIGS. 12 and 13, the LP-EGR cooler capacity and pumps the required EGR mass with the EGR compressor to the injector upstream of the charge air cooler. This ensures the required heavy EGR cooling. Additionally the charge air compressor can be sized to suit just the fresh air mass flow, leading to a smaller charge air compressor which will fit the other requirements (low end torque, low inertia for transient performance). The method 980 then returns.

In this way, regulating exhaust flow path and intake air flow paths in conjunction with flowing the exhaust through aftertreatment device/s in an internal combustion engine coupled to two turbochargers in series may provide the desired engine torque along with efficient emission control.

The technical effect of regulating exhaust and intake air flow paths in a supercharged internal combustion engine with two superchargers arranged in series includes generation of adequate boost pressure to meet torque demand at different engine operating conditions, including at various engine load and engine speed conditions, thereby increasing supercharging efficiency. Additionally, flowing the exhaust gas, under all operating conditions, through at least some turbine before flowing to a downstream aftertreatment device may enable the aftertreatment device to reach light-off temperature for efficient emission control, especially during cold start conditions.

In one example, an engine includes a first cylinder group connected to a first turbine through a first exhaust line, a second cylinder group connected to a second turbine through a second exhaust line, the second turbine parallel to the first turbine, a first compressor downstream of a second compressor arranged in series along an intake system, and a connecting line connecting the first exhaust line to the second exhaust line. In a first example of the system, wherein the connecting line branches off from the first exhaust line upstream of the first turbine and connects to the second exhaust line upstream of the second turbine. A second example of the system optionally includes the first example and further includes, wherein a first bypass line with a first shut-off valve, the first bypass line branching off from the intake system between the first compressor and the second compressor, connecting back to the intake system downstream of the first compressor, and a second bypass line with a second shut-off valve, the second bypass line branching off from the intake system upstream of the second compressor, connecting back to the intake system downstream of the second compressor. A third example of the system optionally includes one or more of the first and second examples, and further includes a controller including instructions to regulate a position of the first shut-off valve and a position of the second shut-off valve responsive to engine operating conditions. A fourth example of the system optionally includes one or more of the first through the third examples, and further includes the first turbine being a fixed geometry turbine and the second turbine being a variable geometry turbine. A fifth example of the system optionally includes one or more of the first through the fourth examples, and further includes a first turbine-side shut-off element and a second turbine-side shut-off element, wherein the first turbine-side shut-off element is arranged between the first turbine and the connecting line at the first exhaust line and the second turbine-side shut-off element is arranged between the second turbine and the connecting line at the second exhaust line. A sixth example of the system optionally includes one or more of the first through the fifth examples, and further includes a first charge-air cooler and a second charge air cooler, wherein the first charge-air cooler is arranged in the intake system downstream of the second compressor and the second charge-air cooler is arranged in the intake system between the first compressor and the second compressor. A seventh example of the system optionally includes one or more of the first through the sixth examples, and further includes wherein the second bypass line opens into the intake system between the first charge-air cooler and the first compressor. An eighth example of the system optionally includes one or more of the first through the seventh examples, and further includes when the first turbine-side shut-off element is fully closed and the second turbine-side shut-off element is fully open, all exhaust gas from the engine flows through the second turbine. A ninth example of the system optionally includes one or more of the first through the eighth examples, and further includes wherein the first compressor is smaller than the second compressor and the first turbine is smaller than the second turbine. A tenth example of the system optionally includes one or more of the first through the ninth examples, and further includes wherein the first cylinder group includes two outer cylinders and the second cylinder group includes at least one inner cylinder. An eleventh example of the system optionally includes one or more of the first through the tenth examples, and further includes wherein the first turbine is coupled to the first compressor forming a first turbocharger and the second turbine is coupled to the second compressor forming a second turbocharger.

In another example, a first group of switchable cylinders each including a respective first exhaust valve, a second group of cylinders each including a respective first exhaust valve and a respective second exhaust valve, a first exhaust line with a first turbine of a first turbocharger connected to the first group of switchable cylinders through the respective first exhaust valves, a second exhaust line with a second turbine of a second turbocharger connected to the second group of cylinders through the respective second exhaust valves, a first compressor of the first turbocharger arranged along a first intake line and a second compressor of the second turbocharger arranged along a second intake line, wherein the first compressor is parallel to the second compressor, and a controller including instructions executable to responsive to engine torque below a threshold torque, actuate each respective second exhaust valve and deactivate each respective first exhaust valve to deactivate the first group of cylinders and flow exhaust gas from the second group of cylinders to the second turbine. In a first example of the system, the first exhaust valve has a larger cross-sectional area than the second exhaust valve. A second example of the system optionally includes the first example and further includes, wherein the first group of switchable cylinders includes at least one inner cylinder of the engine and the second group of cylinders includes two outer cylinders of the engine, wherein the second group of cylinders is connected to the first turbine via the respective first exhaust valves of the second group of cylinders, and wherein the controller includes instructions executable to, responsive to engine torque above the threshold torque, actuate each respective first exhaust valve and deactivate each respective second exhaust valve to activate the first group of cylinders and the second group of cylinders and flow exhaust gas from the first group of cylinders and the second group of cylinders to the first turbine. A third example of the system optionally includes one or more of the first and second examples, and further includes wherein the first turbine has a variable turbine geometry and the second turbine has a non-variable turbine geometry. When exhaust gas flows from the second group of cylinders to the second turbine, the first turbine is bypassed, and when exhaust gas flows from all cylinders to the first turbine, the second turbine is bypassed.

In an additional example, a system includes a first low-pressure turbocharger with a first turbine and a first compressor, and a second high-pressure turbocharger with a second turbine and a second compressor, the first turbocharger and second turbocharger arranged in series along an exhaust section and an intake section of the engine, with the second turbine arranged upstream of the first turbine in the exhaust section and the second compressor arranged downstream of the first compressor in the intake system, a first bypass line with a first valve, the first bypass line branching off from a first junction point from the exhaust section between the first turbine and the second turbine and opening into the intake section downstream of the first compressor and upstream of the second compressor, a second bypass line with a second valve, the second bypass line branching off from the exhaust section upstream of the second turbine and opening back into the exhaust section again between the first turbine and the second turbine, a third bypass line with a third valve, the third bypass line connecting the intake system from upstream of the first compressor to upstream of the second compressor, at least one exhaust-gas aftertreatment system along the exhaust section downstream of the first turbine and the second turbine, and a charge-air cooler arranged in the intake system between the first compressor and the second compressor. In a first example of the system, further comprising wherein at least one further exhaust-gas aftertreatment system is provided in the first bypass line. A second example of the system optionally includes the first example and further includes, wherein the first turbine is larger than the second turbine. A third example of the system optionally includes one or more of the first and second examples, and further includes wherein the first turbine of the first low-pressure turbocharger has a variable turbine geometry.

Another example of an internal combustion engine may include an exhaust tract, an intake tract, a first turbocharger and a second turbocharger, wherein the second turbocharger is arranged serially with respect to the first turbocharger such that the turbine of the first turbocharger and the turbine of the second turbocharger are fluidically connected via at least one exhaust line of the exhaust tract, wherein at least one first exhaust gas aftertreatment device is arranged in the exhaust line downstream of the turbine of the first turbocharger, and at least one line of an exhaust gas recirculation arrangement, via which a fluidic connection to an intake line of the intake tract can be produced, branches off from the exhaust line downstream of the first exhaust gas aftertreatment device. The line of the exhaust gas recirculation arrangement may be connected to the intake line by means of a combination valve. In another example, the line of the exhaust gas recirculation arrangement may be connected to the intake line downstream of the compressor of the second turbocharger. A first charge air cooler may be additionally arranged in the intake line downstream of the combination valve. Upstream of the first charge air cooler, a first bypass line with a cooler bypass valve branches off from the intake line and, downstream of the first charge air cooler, opens again into the intake line. Downstream of the first charge air cooler and upstream of the compressor of the first turbocharger, a second bypass line with a compressor bypass valve branches off from the intake line and, downstream of the compressor of the first turbocharger, opens again into the intake line. A condensate outlet valve may fluidically connect the first charge air cooler and the inlet manifold of the internal combustion engine. A fourth bypass line with a turbine bypass valve may be arranged in the exhaust tract, the bypass line branching off from the exhaust line downstream of the internal combustion engine and opening into the exhaust line upstream of the turbine of the second turbocharger. A second exhaust gas aftertreatment device may be arranged in the exhaust line downstream of the turbine of the second turbocharger.

An example method for operating an internal combustion engine, wherein the internal combustion engine may be supercharged in two stages by the first turbocharger and second turbocharger, which are arranged in series, the exhaust gas flow from the turbine of the first turbocharger may be conducted to a first exhaust gas aftertreatment device, a first part of the exhaust gas flow is supplied downstream of the first exhaust gas aftertreatment device via a line branching off from the exhaust line to the intake line upstream of the first charge air cooler and a second part of the exhaust gas flow is conducted into the turbine of the second turbocharger. The cooler bypass valve in the first bypass line may be opened at a low load of the internal combustion engine. The turbine bypass valve in the fourth bypass line may be opened at a high load of the internal combustion engine. The condensate outlet valve in the third bypass line may be opened when condensate has formed in the first charge air cooler.

One example of a motor vehicle may include an internal combustion engine, an inlet air line, an exhaust tract, an exhaust gas recirculation line leading from the exhaust tract to the inlet air line, and a first compressor, which is arranged in the inlet air line, wherein an exhaust gas aftertreatment device is arranged in the exhaust tract and the exhaust gas recirculation line is connected to the exhaust tract downstream of the exhaust gas aftertreatment device, wherein the motor vehicle has a second compressor, which is arranged in the exhaust gas recirculation line. The exhaust tract may have a first exhaust line and a first exhaust turbine, which may be arranged in the first exhaust line and may be connected in a torque-transmitting manner to the first compressor. The first exhaust turbine may be a variable turbine geometry. The exhaust tract has a second exhaust line and a second exhaust turbine, which may be arranged in the second exhaust line and may be connected in a torque-transmitting manner to the second compressor. The second compressor may be connected in a torque-transmitting manner to a motor. The motor may be an electric motor. The motor vehicle may include a charge air cooler arranged in the inlet air line downstream of the first compressor. The motor vehicle may include an exhaust gas cooler arranged in the exhaust gas recirculation line upstream of the second compressor. The exhaust gas recirculation line may admit exhaust gas to the inlet air line at a first inlet point arranged upstream of the first compressor. The exhaust gas recirculation line may admit exhaust gas to the inlet air line at a second inlet point arranged downstream of the first compressor. The exhaust gas recirculation line may be designed to admit exhaust gas to the inlet air line at a third inlet point arranged downstream of the charge air cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine, comprising:
a first cylinder group connected to a first turbine through a first exhaust line;
a second cylinder group connected to a second turbine through a second exhaust line, the second turbine parallel to the first turbine;
a first compressor downstream of a second compressor arranged in series along an intake system; and
a connecting line connecting the first exhaust line to the second exhaust line;
wherein the first cylinder group includes two outer cylinders and the second cylinder group includes at least one inner cylinder.

2. The engine of claim 1, wherein the connecting line branches off from the first exhaust line upstream of the first turbine and connects to the second exhaust line upstream of the second turbine.

3. The engine of claim 1, further comprising a first bypass line with a first shut-off valve, the first bypass line branching off from the intake system between the first compressor and the second compressor, connecting back to the intake system downstream of the first compressor, and a second bypass line with a second shut-off valve, the second bypass line branching off from the intake system upstream of the second compressor, connecting back to the intake system downstream of the second compressor.

4. The engine of claim 3, further comprising a controller including instructions to regulate a position of the first shut-off valve and a position of the second shut-off valve responsive to engine operating conditions.

5. The engine of claim 1, wherein the first turbine is a fixed geometry turbine and the second turbine is a variable geometry turbine.

6. The engine of claim 1, further comprising a first turbine-side shut-off element and a second turbine-side shut-off element, wherein the first turbine-side shut-off element is arranged between the first turbine and the connecting line at the first exhaust line and the second turbine-side shut-off element is arranged between the second turbine and the connecting line at the second exhaust line.

7. The engine of claim 6, wherein, when the first turbine-side shut-off element is fully closed and the second turbine-side shut-off element is fully open, all exhaust gas from the engine flows through the second turbine.

8. The engine of claim 1, wherein the first compressor is smaller than the second compressor and the first turbine is smaller than the second turbine.

9. The engine of claim 1, wherein the first turbine is coupled to the first compressor forming a first turbocharger and the second turbine is coupled to the second compressor forming a second turbocharger.

* * * * *